United States Patent
Zhang et al.

(10) Patent No.: US 10,785,009 B2
(45) Date of Patent: Sep. 22, 2020

(54) REFERENCE SIGNAL TRANSMISSION METHOD AND RELATED DEVICE AND SYSTEM

(71) Applicant: HUAWEI TECHNOLOGIES CO., LTD., Shenzhen, Guangdong (CN)

(72) Inventors: Lili Zhang, Beijing (CN); Richard Stirling-Gallacher, Munich (DE); Xiaodong Sun, Shenzhen (CN); Bin Liu, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/308,327

(22) PCT Filed: Jun. 8, 2016

(86) PCT No.: PCT/CN2016/085327
§ 371 (c)(1),
(2) Date: Dec. 7, 2018

(87) PCT Pub. No.: WO2017/210903
PCT Pub. Date: Dec. 14, 2017

(65) Prior Publication Data
US 2019/0260557 A1    Aug. 22, 2019

(51) Int. Cl.
*H04L 5/00* (2006.01)
*H04L 25/02* (2006.01)
(Continued)

(52) U.S. Cl.
CPC .......... *H04L 5/0073* (2013.01); *H04L 5/0051* (2013.01); *H04L 5/0053* (2013.01);
(Continued)

(58) Field of Classification Search
CPC ....... H04L 5/00; H04L 5/0051; H04L 5/0053; H04L 5/0073; H04L 5/1469; H04L 25/02;
(Continued)

(56) References Cited

U.S. PATENT DOCUMENTS 8,649,347 B2 *   2/2014   Zhang ................... H04L 5/0035
                                                            370/329
9,338,673 B2 *   5/2016   Cheng ................... H04W 24/02
(Continued)

FOREIGN PATENT DOCUMENTS

CN          1750702 A       3/2006
CN        103188797 A       7/2013
(Continued)

OTHER PUBLICATIONS

3GPP TS 36.213 V13.1.1 (Mar. 2016), 3rd Generation Partnership Project;Technical Specification Group Radio Access Network;Evolved Universal Terrestrial Radio Access (E-UTRA);Physical layer procedures(Release 13), Mar. 2016. total 341 pages.
(Continued)

*Primary Examiner* — Tri H Phan
(74) *Attorney, Agent, or Firm* — Fish & Richardson P.C.

(57) ABSTRACT

A reference signal transmission method and a related device and system are disclosed. The method includes: determining, by a first base station, at least one target subframe on a target frequency band, where the target frequency band is a frequency band whose uplink and downlink transmission directions are configurable, and uplink-downlink timeslot configurations and/or transmission directions of the first base station and a neighboring second base station in the at least one target subframe are different; and sending, by the first base station, a first reference signal to first user equipment UE in the at least one target subframe, where the first UE is UE served by the first base station. When embodi-
(Continued)

ments of the present invention are implemented, a reference signal can be transmitted on a flexible frequency band, thereby effectively reducing interference between reference signals between neighboring cells in a flexible duplex system.

20 Claims, 8 Drawing Sheets

(51) Int. Cl.

| | | |
|---|---|---|
| H04W 24/10 | (2009.01) | |
| H04W 72/04 | (2009.01) | |
| H04W 72/08 | (2009.01) | |
| H04L 5/14 | (2006.01) | |
| H04J 13/00 | (2011.01) | |
| H04L 27/26 | (2006.01) | |

(52) U.S. Cl.
CPC ........ *H04L 5/1469* (2013.01); *H04L 25/0226* (2013.01); *H04W 24/10* (2013.01); *H04W 72/04* (2013.01); *H04W 72/042* (2013.01); *H04W 72/082* (2013.01); *H04J 13/0062* (2013.01); *H04L 27/2607* (2013.01)

(58) Field of Classification Search
CPC . H04L 25/0226; H04L 27/26; H04L 27/2607; H04W 24/10; H04W 72/04; H04W 72/042; H04W 72/08; H04W 72/082; H04J 13/0062

See application file for complete search history.

(56) References Cited

U.S. PATENT DOCUMENTS

| | | | | |
|---|---|---|---|---|
| 9,525,466 | B2* | 12/2016 | Yum | .................... H04J 11/0053 |
| 9,686,050 | B2* | 6/2017 | Rahman | .............. H04W 72/082 |
| 9,844,046 | B2* | 12/2017 | Wang | .................... H04L 5/0094 |
| 10,250,371 | B2* | 4/2019 | Chen | .................. H04W 72/0473 |
| 10,462,795 | B2* | 10/2019 | Tiirola | .............. H04W 72/0413 |
| 2008/0192660 | A1 | 8/2008 | Li et al. | |
| 2014/0056186 | A1 | 2/2014 | Gao et al. | |
| 2014/0204807 | A1 | 7/2014 | Li et al. | |
| 2014/0369221 | A1 | 12/2014 | Fu et al. | |
| 2017/0041122 | A1 | 2/2017 | Li et al. | |
| 2017/0280467 | A1 | 9/2017 | Zhu et al. | |

FOREIGN PATENT DOCUMENTS

| | | |
|---|---|---|
| CN | 103944668 A | 7/2014 |
| CN | 105099631 A | 11/2015 |
| CN | 105407474 A | 3/2016 |
| WO | 2014161592 A1 | 10/2014 |
| WO | 2015043633 A1 | 4/2015 |
| WO | 2016037516 A1 | 3/2016 |

OTHER PUBLICATIONS

International Search Report and Written Opinion issued in International Application No. PCT/CN2016/085327 dated Mar. 2, 2017, 25 pages.
XP051096649 R1-165375 Nokia et al.,"On the cross-link interference mitigation",3GPP TSG-RAN WG1 #85,Nanjing, P.R. China, May 23-27, 2016,total 3 pages.
XP050663497 R1-130015 Huawei et al.,"Interference mitigation schemes for TDD eIMTA",3GPP TSG RAN WG1 Meeting #72,St Julian's, Malta, Jan. 28-Feb. 1, 2013,total 5 pages.
XP050697971 R1-132199 New Postcom,"Considerations on issues of interference mitigation schemes",3GPP TSG RAN WG1 Meeting #73,Fukuoka, Japan, May 20-24, 2013,total 4 pages.
Extended European Search Report issued in European Application No. 16904356.9 dated Mar. 21, 2019, 10 pages.

* cited by examiner

REFERENCE SIGNAL TRANSMISSION METHOD AND RELATED DEVICE AND SYSTEM

CROSS-REFERENCE TO RELATED APPLICATIONS

This application is a national stage of International Application No. PCT/CN2016/085327, filed on Jun. 8, 2016, which is hereby incorporated by reference in its entirety.

TECHNICAL FIELD

The present invention relates to the field of communications technologies, and in particular, to a reference signal transmission method and a related device and system.

BACKGROUND

Currently, among standards developed by the 3GPP (3rd Generation Partnership Project, 3rd Generation Partnership Project), LTE (Long Term Evolution, Long Term Evolution) can support two manners: FDD (Frequency Division Duplex, frequency division duplex) and TDD (Time Division Duplex, time division duplex). In an FDD system, UE (User Equipment, user equipment) sends and receives signals on two symmetrical spectrum resources. This manner is applicable to voice service communication. However, for a mobile data service whose uplink and downlink requirements present characteristics such as asymmetry and time-varying, the FDD manner may not be able to meet the requirements. In a TDD system, the UE sends and receives signals in different timeslots on a same spectrum resource. In this manner, an uplink-downlink timeslot configuration may be adjusted based on a change in a traffic volume of a network, but it is required that strict time synchronization be ensured for an uplink/downlink handover between a base station and the UE. Requirements of uplink and downlink traffic volumes not only change with time but also change with areas. As a result, the TDD manner also cannot meet a changing requirement of a wireless network. To address the foregoing problem, the 3GPP introduces a flexible duplex technology. When the downlink traffic volume is larger than the uplink traffic volume, an uplink frequency band can be converted into a downlink frequency band, to better adapt to a change in the uplink and downlink traffic volumes.

In an existing LTE system, to avoid inter-cell interference, for design of an uplink demodulation reference signal (Demodulation Reference Signal, DMRS), all DMRSs in the system have a same location and are located in a fourth symbol in each timeslot, so that an inter-cell user may reduce interference by configuring different frequency hopping patterns and sequence shifts. For design of a downlink reference signal, a principle of even distribution is followed, so that the inter-cell user may reduce interference by performing a shift based on a physical-layer cell identity. However, when the LTE system performs transmission in a flexible duplex manner, because neighboring cells perform different transmission (for example, a cell 1 performs uplink transmission, whereas a cell 2 performs downlink transmission), uplink and downlink reference signals between the cells are severely interfered if the foregoing reference signal design method is still used. Therefore, how to transmit a reference signal to reduce interference between reference signals between neighboring cells in a flexible duplex system is an urgent problem to be solved at present.

SUMMARY

Embodiments of the present invention disclose a reference signal transmission method and a related device and system, so as to resolve a problem of how to transmit a reference signal to reduce interference between reference signals between neighboring cells in a flexible duplex system.

A first aspect of the embodiments of the present invention discloses a reference signal transmission method, including:

determining, by a first base station, at least one target subframe on a target frequency band, where the target frequency band is a frequency band whose uplink and downlink transmission directions are configurable, and uplink-downlink timeslot configurations and/or transmission directions of the first base station and a neighboring second base station in the at least one target subframe are different; and sending, by the first base station, a first reference signal to first user equipment UE in the at least one target subframe, where the first UE is UE under the first base station.

In an implementation, the first reference signal includes at least one of a demodulation reference signal DMRS, a sounding reference signal SRS, and a first predetermined reference signal.

In an implementation, before the sending, by the first base station, a first reference signal to first user equipment UE in the at least one target subframe, the method further includes:

receiving, by the first base station, a second reference signal sent by the second base station, and configuring the first reference signal based on the second reference signal; or receiving, by the first base station, configuration information that is of the second reference signal and that is sent by the second base station, and configuring the first reference signal based on the configuration information of the second reference signal, where the second reference signal is a reference signal configured by the second base station in the at least one target subframe for UE under the second base station.

In an implementation, the configuration information of the second reference signal includes at least one of a sequence length, a cyclic shift, a format of downlink control information DCI, a cell identity, an initial value of a Zadoff-Chu sequence, and an orthogonal code that are of the second reference signal.

In an implementation, the first reference signal is configured to be orthogonal to the second reference signal.

In an implementation, the second reference signal includes at least one of an uplink DMRS, an uplink SRS, and a second predetermined reference signal.

In an implementation, the method further includes:

sending, by the first base station, the first reference signal to the second base station, so that the second base station updates the second reference signal based on the first reference signal; or sending, by the first base station, configuration information of the first reference signal to the second base station, so that the second base station updates the second reference signal based on the configuration information of the first reference signal.

In an implementation, the configuration information of the first reference signal includes at least one of a sequence length, a cyclic shift, a format of downlink control information DCI, a cell identity, an initial value of a Zadoff-Chu sequence, and an orthogonal code that are of the first reference signal.

In an implementation, the method further includes:

determining, by the first base station, a measurement subframe from the at least one target subframe, where the measurement subframe is a subframe in which interference measurement is performed between the first UE and second UE, and the second UE is UE that is under the second base station and that causes interference to the first UE.

In an implementation, the method further includes:

receiving, by the first base station, first scheduling information that is intended for the second UE and that is sent by the second base station.

In an implementation, the method further includes:

sending, by the first base station, target configuration information to the first UE, where the target configuration information is used to indicate the measurement subframe and/or the first scheduling information, so that the first UE performs, in the measurement subframe, measurement on a first signal transmitted by the second UE.

In an implementation, the first scheduling information is uplink scheduling information or first predetermined scheduling information.

In an implementation, the first signal includes at least one of a DMRS, an SRS, a sequence code, a preamble, and a third predetermined reference signal.

In an implementation, the method further includes:

receiving, by the first base station, interference measurement information sent by the first UE.

In an implementation, the method further includes:

determining, by the first base station, second scheduling information based on the interference measurement information and/or the first scheduling information, and sending the second scheduling information to the first UE, so that the first UE cancels or suppresses signal interference from the second UE based on the second scheduling information.

In an implementation, the second scheduling information is downlink scheduling information or second predetermined scheduling information.

In an implementation, the interference measurement information is an interference matrix.

In an implementation, the target configuration information is sent by using signaling, where the signaling includes one of radio resource control RRC signaling, media access control MAC signaling, and physical layer signaling.

In an implementation, the first scheduling information includes at least one of an identity of the second UE, an identity of a physical resource block PRB occupied by the second UE, and transmit power of the second UE.

In an implementation, the determining, by the first base station, a measurement subframe from the at least one target subframe includes:

determining, by the first base station, the measurement subframe from the at least one target subframe through Operation Administration and Maintenance OAM; or determining, by the first base station, the measurement subframe from the at least one target subframe through negotiation with the second base station; or receiving, by the first base station, the measurement subframe sent by the second base station.

In an implementation, the method further includes:

obtaining, by the first base station, an interference cancellation capability of the first UE.

In an implementation, the determining, by the first base station, second scheduling information based on the interference measurement information and/or the first scheduling information includes:

determining, by the first base station, the second scheduling information based on at least one of the interference measurement information, the first scheduling information, and the interference cancellation capability of the first UE.

A second aspect of the embodiments of the present invention discloses a reference signal transmission method, including:

obtaining, by first user equipment UE, at least one target subframe on a target frequency band, where the target frequency band is a frequency band whose uplink and downlink transmission directions are configurable, uplink-downlink timeslot configurations and/or transmission directions of a first base station and a neighboring second base station in the at least one target subframe are different, and the first base station is a base station to which the first UE belongs; and receiving, by the first UE in the at least one target subframe, a first reference signal sent by the first base station.

In an implementation, the first reference signal includes at least one of a demodulation reference signal DMRS, a sounding reference signal SRS, and a first predetermined reference signal.

In an implementation, the method further includes:

receiving, by the first UE, target configuration information sent by the first base station, where the target configuration information is used to indicate a measurement subframe and/or first scheduling information that is intended for second UE, the measurement subframe is a subframe in which interference measurement is performed between the first UE and the second UE, the second UE is UE that is under the second base station and that causes interference to the first UE, and the first scheduling information is sent to the first base station by the second base station.

In an implementation, the first scheduling information is uplink scheduling information or first predetermined scheduling information.

In an implementation, the first scheduling information includes at least one of an identity of the second UE, an identity of a physical resource block PRB occupied by the second UE, and transmit power of the second UE.

In an implementation, the method further includes:

performing, by the first UE in the measurement subframe, measurement on a first signal transmitted by the second UE, to obtain a measurement result.

In an implementation, the first signal includes at least one of a DMRS, an SRS, a sequence code, a preamble, and a third predetermined reference signal.

In an implementation, the method further includes:

determining, by the first UE, interference measurement information based on the measurement result.

In an implementation, the method further includes:

directly sending, by the first UE, the measurement result to the first base station.

In an implementation, the method further includes:

sending, by the first UE, the interference measurement information to the first base station.

In an implementation, the interference measurement information is an interference matrix.

In an implementation, the method further includes:

receiving, by the first UE, second scheduling information that is determined by the first base station based on the interference measurement information and/or the first scheduling information.

In an implementation, the method further includes:

canceling or suppressing, by the first UE, signal interference from the second UE based on the second scheduling information.

In an implementation, the second scheduling information is downlink scheduling information or second predetermined scheduling information.

In an implementation, the method further includes:

sending, by the first UE, an interference cancellation capability of the first UE to the first base station.

In an implementation, the receiving, by the first UE, second scheduling information that is determined by the first base station based on the interference measurement information and/or the first scheduling information includes:

receiving, by the first UE, the second scheduling information that is determined by the first base station based on at least one of the interference measurement information, the first scheduling information, and the interference cancellation capability of the first UE.

In an implementation, the target configuration information is sent by using signaling, where the signaling includes one of radio resource control RRC signaling, media access control MAC signaling, and physical layer signaling.

A third aspect of the embodiments of the present invention discloses a reference signal transmission method, including:

determining, by a second base station, at least one target subframe on a target frequency band, where the target frequency band is a frequency band whose uplink and downlink transmission directions are configurable, and uplink-downlink timeslot configurations and/or transmission directions of the second base station and a neighboring first base station in the at least one target subframe are different;

receiving, by the second base station, a first reference signal sent by the first base station, where the first reference signal is a reference signal configured by the first base station in the at least one target subframe for UE under the first base station; and configuring, by the second base station, a second reference signal of the second base station based on the first reference signal.

In an implementation, the first reference signal includes at least one of a demodulation reference signal DMRS, a sounding reference signal SRS, and a first predetermined reference signal.

In an implementation, the second reference signal includes at least one of an uplink DMRS, an uplink SRS, and a second predetermined reference signal.

In an implementation, the second reference signal is configured to be orthogonal to the first reference signal.

In an implementation, the method further includes:

sending, by the second base station, the second reference signal to the first base station, so that the first base station updates the first reference signal based on the second reference signal; or sending, by the second base station, configuration information of the second reference signal to the first base station, so that the first base station updates the first reference signal based on the configuration information of the second reference signal.

In an implementation, the configuration information of the second reference signal includes at least one of a sequence length, a cyclic shift, a format of downlink control information DCI, a cell identity, an initial value of a Zadoff-Chu sequence, and an orthogonal code that are of the second reference signal.

In an implementation, the method further includes:

determining, by the second base station, a measurement subframe from the at least one target subframe, where the measurement subframe is a subframe in which interference measurement is performed between first user equipment UE and second UE, the first UE is UE under the first base station, and the second UE is UE that is under the second base station and that causes interference to the first UE.

In an implementation, the method further includes:

sending, by the second base station, target configuration information to the second UE, where the target configuration information is used to indicate the measurement subframe and/or first scheduling information that is intended for the second UE, so that the second UE sends a first signal in the measurement subframe, and the first signal is used to instruct the first UE to measure interference between the first UE and the second UE.

In an implementation, the first scheduling information is uplink scheduling information or first predetermined scheduling information.

In an implementation, the first signal includes at least one of a DMRS, an SRS, a sequence code, a preamble, and a third predetermined reference signal.

In an implementation, the determining, by the second base station, a measurement subframe from the at least one target subframe includes:

determining, by the second base station, the measurement subframe from the at least one target subframe through Operation Administration and Maintenance OAM; or determining, by the second base station, the measurement subframe from the at least one target subframe through negotiation with the first base station; or receiving, by the second base station, the measurement subframe sent by the first base station.

In an implementation, the target configuration information is sent by using signaling, where the signaling includes one of radio resource control RRC signaling, media access control MAC signaling, and physical layer signaling.

In an implementation, the first scheduling information includes at least one of an identity of the second UE, an identity of a physical resource block PRB occupied by the second UE, and transmit power of the second UE.

In an implementation, the method further includes:

sending, by the second base station, the first scheduling information to the first base station, so that the first base station determines, based on the first scheduling information, second scheduling information that is intended for the first UE, where the second scheduling information is used to instruct the first UE to cancel or suppress signal interference from the second UE.

In an implementation, the second scheduling information is downlink scheduling information or second predetermined scheduling information.

A fourth aspect of the embodiments of the present invention discloses a reference signal transmission method, including:

receiving, by second user equipment UE, target configuration information sent by a second base station, where the target configuration information is used to indicate a measurement subframe and/or first scheduling information of the second UE, the measurement subframe is a subframe in which interference measurement is performed between first UE and the second UE, the second base station is a base station to which the second UE belongs, and the first UE is UE that is under a first base station neighboring to the second base station and that is interfered by the second UE.

In an implementation, the method further includes:

sending, by the second UE, a first signal in the measurement subframe based on the first scheduling information, where the first signal is used to instruct the first UE to measure interference between the first UE and the second UE.

In an implementation, the first scheduling information is uplink scheduling information or first predetermined scheduling information.

In an implementation, the first signal includes at least one of a demodulation reference signal DMRS, a demodulation reference signal SRS, a sequence code, a preamble, and a third predetermined reference signal.

In an implementation, the first scheduling information includes at least one of an identity of the second UE, an identity of a physical resource block PRB occupied by the second UE, and transmit power of the second UE.

In an implementation, the target configuration information is sent by using signaling, where the signaling includes one of radio resource control RRC signaling, media access control MAC signaling, and physical layer signaling.

A fifth aspect of the embodiments of the present invention discloses a base station, including:

a determining unit, configured to determine at least one target subframe on a target frequency band, where the target frequency band is a frequency band whose uplink and downlink transmission directions are configurable, and uplink-downlink timeslot configurations and/or transmission directions of the base station and a neighboring second base station in the at least one target subframe are different; and a sending unit, configured to send a first reference signal to first user equipment UE in the at least one target subframe, where the first UE is UE under the base station.

In an implementation, the first reference signal includes at least one of a demodulation reference signal DMRS, a sounding reference signal SRS, and a first predetermined reference signal.

In an implementation, the base station further includes:

a receiving unit, configured to: before the sending unit sends the first reference signal to the first user equipment UE in the at least one target subframe, receive a second reference signal sent by the second base station, and configure the first reference signal based on the second reference signal; or receive configuration information that is of the second reference signal and that is sent by the second base station, and configure the first reference signal based on the configuration information of the second reference signal, where the second reference signal is a reference signal configured by the second base station in the at least one target subframe for UE under the second base station.

In an implementation, the configuration information of the second reference signal includes at least one of a sequence length, a cyclic shift, a format of downlink control information DCI, a cell identity, an initial value of a Zadoff-Chu sequence, and an orthogonal code that are of the second reference signal.

In an implementation, the first reference signal is configured to be orthogonal to the second reference signal.

In an implementation, the second reference signal includes at least one of an uplink DMRS, an uplink SRS, and a second predetermined reference signal.

In an implementation,
the sending unit is further configured to: send the first reference signal to the second base station, so that the second base station updates the second reference signal based on the first reference signal; or send configuration information of the first reference signal to the second base station, so that the second base station updates the second reference signal based on the configuration information of the first reference signal.

In an implementation, the configuration information of the first reference signal includes at least one of a sequence length, a cyclic shift, a format of downlink control information DCI, a cell identity, an initial value of a Zadoff-Chu sequence, and an orthogonal code that are of the first reference signal.

In an implementation, the determining unit is further configured to determine a measurement subframe from the at least one target subframe, where the measurement subframe is a subframe in which interference measurement is performed between the first UE and second UE, and the second UE is UE that is under the second base station and that causes interference to the first UE.

In an implementation, the receiving unit is further configured to receive first scheduling information that is intended for the second UE and that is sent by the second base station.

In an implementation, the sending unit is further configured to send target configuration information to the first UE, where the target configuration information is used to indicate the measurement subframe and/or the first scheduling information, so that the first UE performs, in the measurement subframe, measurement on a first signal transmitted by the second UE.

In an implementation, the first scheduling information is uplink scheduling information or first predetermined scheduling information.

In an implementation, the first signal includes at least one of a DMRS, an SRS, a sequence code, a preamble, and a third predetermined reference signal.

In an implementation, the receiving unit is further configured to receive interference measurement information sent by the first UE.

In an implementation, the determining unit is further configured to: determine second scheduling information based on the interference measurement information and/or the first scheduling information, and send the second scheduling information to the first UE, so that the first UE cancels or suppresses signal interference from the second UE based on the second scheduling information.

In an implementation, the second scheduling information is downlink scheduling information or second predetermined scheduling information.

In an implementation, the interference measurement information is an interference matrix.

In an implementation, the target configuration information is sent by using signaling, where the signaling includes one of radio resource control RRC signaling, media access control MAC signaling, and physical layer signaling.

In an implementation, the first scheduling information includes at least one of an identity of the second UE, an identity of a physical resource block PRB occupied by the second UE, and transmit power of the second UE.

In an implementation, a manner in which the determining unit determines the measurement subframe from the at least one target subframe is specifically:

the determining unit determines the measurement subframe from the at least one target subframe through Operation Administration and Maintenance OAM; or the determining unit determines the measurement subframe from the at least one target subframe through negotiation with the second base station; or the determining unit receives the measurement subframe sent by the second base station.

In an implementation, the base station further includes:

an obtaining unit, configured to obtain an interference cancellation capability of the first UE.

In an implementation, a manner in which the determining unit determines the second scheduling information based on the interference measurement information and/or the first scheduling information is specifically:

the determining unit determines the second scheduling information based on at least one of the interference measurement information, the first scheduling information, and the interference cancellation capability of the first UE.

A sixth aspect of the embodiments of the present invention discloses user equipment UE, including:

an obtaining unit, configured to obtain at least one target subframe on a target frequency band, where the target frequency band is a frequency band whose uplink and downlink transmission directions are configurable, uplink-downlink timeslot configurations and/or transmission directions of a first base station and a neighboring second base station in the at least one target subframe are different, and the first base station is a base station to which the UE belongs; and a receiving unit, configured to receive, in the at least one target subframe, a first reference signal sent by the first base station.

In an implementation, the first reference signal includes at least one of a demodulation reference signal DMRS, a sounding reference signal SRS, and a first predetermined reference signal.

In an implementation, the receiving unit is further configured to receive target configuration information sent by the first base station, where the target configuration information is used to indicate a measurement subframe and/or first scheduling information that is intended for second UE, the measurement subframe is a subframe in which interference measurement is performed between the UE and the second UE, the second UE is UE that is under the second base station and that causes interference to the UE, and the first scheduling information is sent to the first base station by the second base station.

In an implementation, the first scheduling information is uplink scheduling information or first predetermined scheduling information.

In an implementation, the first scheduling information includes at least one of an identity of the second UE, an identity of a physical resource block PRB occupied by the second UE, and transmit power of the second UE.

In an implementation, the UE further includes:

a measurement unit, configured to perform, in the measurement subframe, measurement on a first signal transmitted by the second UE, to obtain a measurement result.

In an implementation, the first signal includes at least one of a DMRS, an SRS, a sequence code, a preamble, and a third predetermined reference signal.

In an implementation, the UE further includes:

a sending unit, configured to directly send the measurement result to the first base station.

In an implementation, the UE further includes:

a determining unit, configured to determine interference measurement information based on the measurement result.

In an implementation, the sending unit is further configured to send the interference measurement information to the first base station.

In an implementation, the interference measurement information is an interference matrix.

In an implementation, the receiving unit is further configured to receive second scheduling information that is determined by the first base station based on the interference measurement information or the measurement result and/or the first scheduling information.

In an implementation, the UE further includes:

an interference suppression unit, configured to cancel or suppress signal interference from the second UE based on the second scheduling information.

In an implementation, the second scheduling information is downlink scheduling information or second predetermined scheduling information.

In an implementation, the sending unit is further configured to send an interference cancellation capability of the UE to the first base station.

In an implementation, a manner in which the receiving unit receives the second scheduling information that is determined by the first base station based on the interference measurement information or the measurement result and/or the first scheduling information is specifically:

the receiving unit receives the second scheduling information that is determined by the first base station based on at least one of the interference measurement information or the measurement result, the first scheduling information, and the interference cancellation capability of the first UE.

In an implementation, the target configuration information is sent by using signaling, where the signaling includes one of radio resource control RRC signaling, media access control MAC signaling, and physical layer signaling.

A seventh aspect of the embodiments of the present invention discloses a base station, including:

a determining unit, configured to determine at least one target subframe on a target frequency band, where the target frequency band is a frequency band whose uplink and downlink transmission directions are configurable, and uplink-downlink timeslot configurations and/or transmission directions of the base station and a neighboring first base station in the at least one target subframe are different;

a receiving unit, configured to receive a first reference signal sent by the first base station, where the first reference signal is a reference signal configured by the first base station in the at least one target subframe for UE under the first base station; and a configuration unit, configured to configure a second reference signal of the base station based on the first reference signal.

In an implementation, the first reference signal includes at least one of a demodulation reference signal DMRS, a sounding reference signal SRS, and a first predetermined reference signal.

In an implementation, the second reference signal includes at least one of an uplink DMRS, an uplink SRS, and a second predetermined reference signal.

In an implementation, the second reference signal is configured to be orthogonal to the first reference signal.

In an implementation, the base station further includes:

a sending unit, configured to: send the second reference signal to the first base station, so that the first base station updates the first reference signal based on the second reference signal; or send configuration information of the second reference signal to the first base station, so that the first base station updates the first reference signal based on the configuration information of the second reference signal.

In an implementation, the configuration information of the second reference signal includes at least one of a sequence length, a cyclic shift, a format of downlink control information DCI, a cell identity, an initial value of a Zadoff-Chu sequence, and an orthogonal code that are of the second reference signal.

In an implementation, the determining unit is further configured to determine a measurement subframe from the at least one target subframe, where the measurement subframe is a subframe in which interference measurement is performed between first user equipment UE and second UE, the first UE is UE under the first base station, and the second UE is UE that is under the base station and that causes interference to the first UE.

In an implementation, the sending unit is further configured to send target configuration information to the second UE, where the target configuration information is used to indicate the measurement subframe and/or first scheduling information that is intended for the second UE, so that the second UE sends a first signal in the measurement subframe, and the first signal is used to instruct the first UE to measure interference between the first UE and the second UE.

In an implementation, the first scheduling information is uplink scheduling information or first predetermined scheduling information.

In an implementation, the first signal includes at least one of a DMRS, an SRS, a sequence code, a preamble, and a third predetermined reference signal.

In an implementation, a manner in which the determining unit determines the measurement subframe from the at least one target subframe is specifically:

the determining unit determines the measurement subframe from the at least one target subframe through Operation Administration and Maintenance OAM; or the determining unit determines the measurement subframe from the at least one target subframe through negotiation with the first base station; or the determining unit receives the measurement subframe sent by the first base station.

In an implementation, the target configuration information is sent by using signaling, where the signaling includes one of radio resource control RRC signaling, media access control MAC signaling, and physical layer signaling.

In an implementation, the first scheduling information includes at least one of an identity of the second UE, an identity of a physical resource block PRB occupied by the second UE, and transmit power of the second UE.

In an implementation, the sending unit is further configured to send the first scheduling information to the first base station, so that the first base station determines, based on the first scheduling information, second scheduling information that is intended for the first UE, where the second scheduling information is used to instruct the first UE to cancel or suppress signal interference from the second UE.

In an implementation, the second scheduling information is downlink scheduling information or second predetermined scheduling information.

An eighth aspect of the embodiments of the present invention discloses user equipment UE, including:

a receiving unit, configured to receive target configuration information sent by a second base station, where the target configuration information is used to indicate a measurement subframe and/or first scheduling information of the UE, the measurement subframe is a subframe in which interference measurement is performed between first UE and the UE, the second base station is a base station to which the UE belongs, and the first UE is UE that is under a first base station neighboring to the second base station and that is interfered by the UE.

In an implementation, the UE further includes:

a sending unit, configured to send a first signal in the measurement subframe based on the first scheduling information, where the first signal is used to instruct the first UE to measure interference between the first UE and the UE.

In an implementation, the first scheduling information is uplink scheduling information or first predetermined scheduling information.

In an implementation, the first signal includes at least one of a demodulation reference signal DMRS, a demodulation reference signal SRS, a sequence code, a preamble, and a third predetermined reference signal.

In an implementation, the first scheduling information includes at least one of an identity of the second UE, an identity of a physical resource block PRB occupied by the second UE, and transmit power of the second UE.

In an implementation, the target configuration information is sent by using signaling, where the signaling includes one of radio resource control RRC signaling, media access control MAC signaling, and physical layer signaling.

A ninth aspect of the embodiments of the present invention discloses a base station, including a processor, an input apparatus, an output apparatus, and a memory, where the memory is configured to store a program and data, and the processor is configured to call the program stored in the memory, to perform the method according to any one disclosed in the first aspect of the embodiments of the present invention.

A tenth aspect of the embodiments of the present invention discloses user equipment UE, including a processor, an input apparatus, an output apparatus, and a memory, where the memory is configured to store a program and data, and the processor is configured to call the program stored in the memory, to perform the method according to any one disclosed in the second aspect of the embodiments of the present invention.

An eleventh aspect of the embodiments of the present invention discloses a base station, including a processor, an input apparatus, an output apparatus, and a memory, where the memory is configured to store a program and data, and the processor is configured to call the program stored in the memory, to perform the method according to any one disclosed in the third aspect of the embodiments of the present invention.

A twelfth aspect of the embodiments of the present invention discloses user equipment UE, including a processor, an input apparatus, an output apparatus, and a memory, where the memory is configured to store a program and data, and the processor is configured to call the program stored in the memory, to perform the method according to any one disclosed in the fourth aspect of the embodiments of the present invention.

A thirteenth aspect of the embodiments of the present invention discloses a reference signal transmission system, including the base station according to any one disclosed in the fifth aspect of the embodiments of the present invention, the UE according to any one disclosed in the sixth aspect of the embodiments of the present invention, the base station according to any one disclosed in the seventh aspect of the embodiments of the present invention, and the UE according to any one disclosed in the eighth aspect of the embodiments of the present invention.

In the embodiments of the present invention, in a flexible duplex system, the first base station may determine the at least one target subframe on the target frequency band, where the target frequency band is a frequency band whose uplink and downlink transmission directions are configurable, and the uplink-downlink timeslot configurations and/or the transmission directions of the first base station and the neighboring second base station in the at least one target subframe are different; and the first base station may send, in the at least one target subframe, the first reference signal to the first UE that is under the first base station. When the embodiments of the present invention are implemented, a base station can transmit a reference signal on a flexible frequency band, thereby effectively reducing interference between reference signals between neighboring cells in the flexible duplex system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention disclose a reference signal transmission method and a related device and system, so as to resolve a problem of how to transmit a reference signal to reduce interference between reference signals between neighboring cells in a flexible duplex system. The following separately describes the reference signal transmission method and the related device and system in detail.

Figure 1:
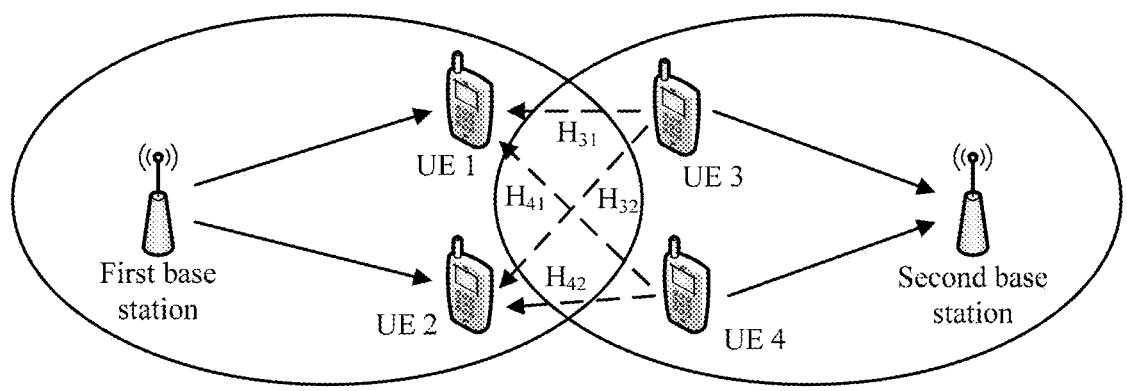
FIG. 1 is a schematic diagram of an application scenario of reference signal transmission disclosed in an embodiment of the present invention.

For a better understanding of the embodiments of the present invention, the following first describes an application scenario of reference signal transmission disclosed in an embodiment of the present invention. With reference to FIG. 1, FIG. 1 is a schematic diagram of an application scenario of reference signal transmission disclosed in an embodiment of the present invention. In the application scenario shown in FIG. 1, at least two base stations (for example, a first base station and a second base station) and at least two UEs (for example, UE 1, UE 2, UE 3, and UE 4) may be included. The at least two base stations are base stations to which small cells (Small Cell) belong. In other words, a small cell is corresponding to a base station. In addition, these base stations are base stations neighboring to each other. In other words, the first base station is neighboring to the second base station. The UE may include various types of devices such as a mobile phone, a palmtop computer, a tablet computer, a personal digital assistant (Personal Digital Assistant, PDA), a mobile Internet device (Mobile Internet Device, MID), and a wearable device (for example, a smartwatch or a smart band), and is not limited in this embodiment of the present invention. The UE 1 and the UE 2 are UEs under the first base station and are edge UEs of the first base station (that is, the UE 1 and the UE 2 are located in an edge region of a coverage area of the first base station). The UE 3 and the UE 4 are UEs under the second base station and are edge UEs of the second base station (that is, the UE 3 and the UE 4 are located in an edge region of a coverage area of the second base station).

In the application scenario shown in FIG. 1, the first base station may perform reference signal transmission with the UE 1 and the UE 2 separately, and the second base station may perform reference signal transmission with the UE 3 and the UE 4 separately. In an existing LTE system, when the first base station performs transmission of an uplink reference signal with UE that belongs to the first base station, the second base station also performs transmission of an uplink reference signal with UE that belongs to the second base station; and when the first base station performs transmission of a downlink reference signal with UE that belongs to the first base station, the second base station also performs transmission of a downlink reference signal with UE that belongs to the second base station. As a result, reference signals between neighboring cells are interfered. In a scenario in which small cells are densely deployed, uplink and downlink reference signals are more severely interfered, because transmit power of a small cell is close to transmit power of UE. To address the foregoing problem, in the application scenario shown in FIG. 1, a flexible duplex technology is introduced, so that uplink and downlink transmission directions can be configured by using a flexible frequency band. For example, when downlink traffic is heavier than uplink traffic, an uplink frequency band can be configured as a downlink frequency band, to meet a requirement of downlink transmission. Based on a flexible duplex system, when the first base station performs transmission of an uplink reference signal with the UE 1 or the UE 2, the second base station is configured to perform transmission of a downlink reference signal with the UE 3 or the UE 4; and when the first base station performs transmission of a downlink reference signal with the UE 1 or the UE 2, the second base station is configured to perform transmission of an uplink reference signal with the UE 3 or the UE 4, so as to implement interference coordination and reduce interference between reference signals between neighboring cells as far as possible. This manner is especially applicable to the scenario in which small cells are densely deployed.

Figure 2:
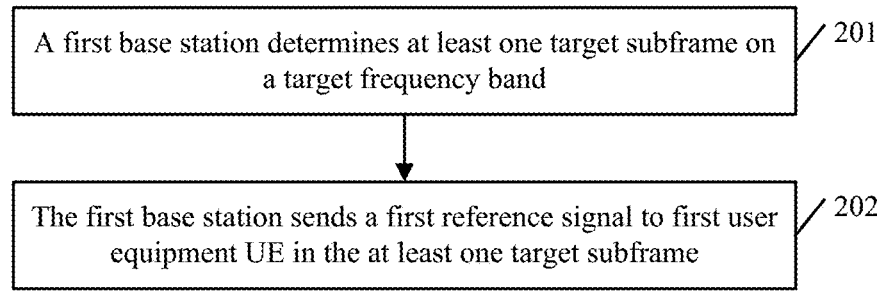
FIG. 2 is a schematic flowchart of a reference signal transmission method disclosed in an embodiment of the present invention.

Based on the application scenario shown in FIG. 1, an embodiment of the present invention discloses a reference signal transmission method. With reference to FIG. 2, FIG. 2 is a schematic flowchart of a reference signal transmission method disclosed in an embodiment of the present invention. The reference signal transmission method is described from a perspective of a first base station. The reference signal transmission method may be applied to a flexible duplex system. As shown in FIG. 2, the reference signal transmission method may include the following steps.

201. The first base station determines at least one target subframe on a target frequency band.

In this embodiment of the present invention, the target frequency band is a frequency band whose uplink and downlink transmission directions are configurable. That is, uplink and downlink transmission directions can be converted based on a service requirement. When downlink traffic is heavier than uplink traffic, an uplink frequency band can be converted into a downlink frequency band; or when uplink traffic is heavier than downlink traffic, a downlink frequency band can be converted into an uplink frequency band. Therefore, the target frequency band may be referred to as a flexible frequency band. The target frequency band may be a carrier or a partial frequency band on a carrier.

In this embodiment of the present invention, the at least one target subframe is determined from the target frequency band, and uplink-downlink timeslot configurations and/or transmission directions of the first base station and a neighboring second base station in the at least one target subframe are different. That is, uplink-downlink timeslot configurations of the first base station and the second base station in any target subframe are different, and for example, an uplink-downlink timeslot configuration of the first base station is 0, and an uplink-downlink timeslot configuration of the second base station is 1; and/or transmission directions of the first base station and the second base station in any target subframe are different, and for example, when the first base station performs downlink transmission, the second base station performs uplink transmission, or when the first base station performs uplink transmission, the second base station performs downlink transmission. The at least one target subframe may be the entire target frequency band, or may be a part of subframes on the target frequency band.

202. The first base station sends a first reference signal to first user equipment UE in the at least one target subframe.

In this embodiment of the present invention, the first UE is UE under the first base station, and may be edge UE under the first base station (that is, the first UE is UE located in an edge region of a coverage area of the first base station). The first reference signal may include but is not limited to at least one of a demodulation reference signal DMRS, a sounding reference signal SRS, a predetermined sequence, a first predetermined reference signal, and the like. After the at least one target subframe is determined from the flexible frequency band, the first base station may send the first reference signal to the first UE in the at least one target subframe, so that when neighboring cells transmit reference signals, interference between the reference signals can be reduced to a maximum degree, and accuracy of reference signal transmission can be improved.

In this embodiment of the present invention, before the first base station sends the first reference signal to the first UE in the at least one target subframe, the first UE may be determined first. In other words, edge UE is determined. A specific implementation process of determining the first UE may be: The first base station determines the first UE based on at least one parameter of an RSRP (Reference Signal Received Power, reference signal received power) parameter, an RSSI (Received Signal Strength Indicator, received signal strength indicator) parameter, and an RSRQ (Reference Signal Received Quality, reference signal received quality) parameter.

In an optional implementation, before step 202 is performed, the method described in FIG. 2 may further include the following step:

(20) the first base station receives a second reference signal sent by the second base station, and configures the first reference signal based on the second reference signal; or

(21) the first base station receives configuration information that is of a second reference signal and that is sent by the second base station, and configures the first reference signal based on the configuration information of the second reference signal.

In this implementation, the second base station may send the second reference signal or the configuration information of the second reference signal to the first base station by using an X2 interface or in a broadcasting manner. The second reference signal is a reference signal configured by the second base station in the at least one target subframe for UE under the second base station, and may include but is not limited to at least one of an uplink DMRS, an uplink SRS, a predetermined sequence, a second predetermined reference signal, and the like. The configuration information of the second reference signal may include but is not limited to at least one of a sequence length, a cyclic shift, a format of downlink control information (Downlink Control Information, DCI), a cell identity (an identity of a cell corresponding to the second base station), an initial value of a Zadoff-Chu sequence, an orthogonal code, and the like that are of the second reference signal.

In this implementation, a specific implementation of configuring the first reference signal based on the second reference signal or the configuration information of the second reference signal is: configuring the first reference signal to be orthogonal to the second reference signal, so as to avoid interference between the reference signals.

In an optional implementation, the method described in FIG. 2 may further include the following step:

(22) the first base station sends the first reference signal to the second base station, so that the second base station updates the second reference signal based on the first reference signal; or

(23) the first base station sends configuration information of the first reference signal to the second base station, so that the second base station updates the second reference signal based on the configuration information of the first reference signal.

In this implementation, because a reference signal does not remain unchanged, the second reference signal may be updated by using the first reference signal or the configuration information of the first reference signal, so as to make the reference signal more perfect. The first base station may send the first reference signal or the configuration information of the first reference signal to the second base station by using an X2 interface. The configuration information of the first reference signal may include but is not limited to at least one of a sequence length, a cyclic shift, a format of downlink control information DCI, a cell identity (an identity of a cell corresponding to the first base station), an initial value of a Zadoff-Chu sequence, an orthogonal code, and the like that are of the first reference signal.

In this embodiment of the present invention, the method described in FIG. 2 further includes the following step:

(24) the first base station determines a measurement subframe from the at least one target subframe.

The measurement subframe is a subframe in which interference measurement is performed between the first UE and second UE, and the second UE is UE that is under the second base station and that causes interference to the first UE. The second UE may be edge UE under the second base station. Interference between the first UE and the second UE may be measured in the measurement subframe.

In an optional implementation, a specific implementation of step (24) that the first base station determines the measurement subframe from the at least one target subframe may include the following step:

(24a) the first base station determines the measurement subframe from the at least one target subframe through Operation Administration and Maintenance (Operation Administration and Maintenance, OAM); or (24b) the first base station determines the measurement subframe from the at least one target subframe through negotiation with the second base station; or (24c) the first base station receives the measurement subframe sent by the second base station, that is, the measurement subframe is determined by the second base station.

Optionally, the method described in FIG. 2 may further include the following step:

(25) the first base station receives first scheduling information that is intended for the second UE and that is sent by the second base station.

The first scheduling information may be obtained by the first base station by using an X2 interface or neighboring cell broadcasting. The first scheduling information may be uplink scheduling information, first predetermined scheduling information, or the like. The first scheduling information may include but is not limited to at least one of an identity of the second UE, an identity of a physical resource block (Physical Resource Block, PRB) occupied by the second UE, transmit power of the second UE, and the like.

Optionally, the method described in FIG. 2 may further include the following step:

(26) the first base station sends target configuration information to the first UE, where the target configuration information is used to indicate the measurement subframe and/or the first scheduling information, so that the first UE performs, in the measurement subframe, measurement on a first signal transmitted by the second UE, to obtain a measurement result, and determines interference measurement information based on the measurement result.

The first signal transmitted by the second UE may be considered as an interference signal of the first UE. In other words, the first signal transmitted by the second UE may cause interference to the first UE. The first signal may include but is not limited to at least one of a DMRS, an SRS, a sequence code, a preamble, and a third predetermined reference signal. The interference measurement information may be an interference matrix. As shown in FIG. 1, an interference matrix generated between the UE 1, and the UE 3 and the UE 4 is $[H_{31}, H_{41}]$, and an interference matrix generated between the UE 2, and the UE 3 and the UE 4 is $[H_{32}, H_{42}]$.

Specifically, the first base station may send the target configuration information to the first UE by using signaling. The signaling may include but is not limited to one of Radio Resource Control (Radio Resource Control, RRC) signaling, media access control (Media Access Control, MAC) signaling, physical layer signaling, and the like.

Optionally, the method described in FIG. 2 may further include the following step:

(27) the first base station receives the interference measurement information or the measurement result sent by the first UE.

Correspondingly, the method described in FIG. 2 may further include the following step:

(28) the first base station determines second scheduling information based on the interference measurement information or the measurement result and/or the first scheduling information, and sends the second scheduling information to the first UE, so that the first UE cancels or suppresses signal interference from the second UE based on the second scheduling information.

The second scheduling information may be downlink scheduling information, second predetermined scheduling information, or the like.

Optionally, the method described in FIG. 2 may further include the following step:

(29) the first base station obtains an interference cancellation capability of the first UE.

A specific implementation of step (28) that the first base station determines the second scheduling information based on the interference measurement information and/or the first scheduling information may be:

the first base station determines the second scheduling information based on at least one of the interference measurement information, the first scheduling information, and the interference cancellation capability of the first UE.

In this embodiment of the present invention, coordinated scheduling and transmission between neighboring cells are performed in the following three manners: 1. When assumed DMRS interference is identified, fully separated time-frequency resource division is performed; 2. reference signals and data between cells are overlapped in transmission but depend on interference cancellation; and 3. reference signals between cells are overlapped in transmission but depend on interference cancellation. Coordinated scheduling and interference cancellation methods may at least include the following three methods: method 1: A reference signal of a subframe that uses a flexible duplex configuration is not sent, to avoid interference between uplink and downlink subframes; method 2: Measurement is performed and an interference matrix is established for a small cell, interference from a service signal of a neighboring cell that uses a flexible duplex configuration is deleted first, and reference signal detection is then performed; and method 3: Measurement is performed and an interference matrix is established for a small cell, interference to a reference signal caused by a neighboring cell that uses a flexible duplex configuration is deleted first, and service signal detection is then performed. Based on the foregoing coordinated scheduling methods, for the method 1, a corresponding DMRS of a neighboring base station is cleared, interference cancellation is not required, and there is a low requirement for a capability of a receiver of UE. For the method 2, for a second base station that performs uplink reception, downlink interference from a first base station is canceled, where the cancellation is based on instantaneous measurement and an operation of a base station receiver, and interference caused by a data signal of a neighboring cell to local DMRS reception is canceled; and for UE that belongs to the first base station, UE-specific interference caused by uplink transmission of a neighboring cell to a local cell is derived, and finally interference caused by data to local DMRS reception is canceled based on a UE ID, a PRB index, transmit power, or instantaneous measurement of an H matrix. For the method 3, for a second base station that performs uplink reception, downlink interference from a first base station is canceled, where the cancellation is based on instantaneous measurement and an operation of a base station receiver, and interference caused by a data signal of a neighboring cell to local DMRS reception is canceled; and for UE that belongs to the first base station, UE-specific interference caused by uplink transmission of a neighboring cell to a local cell is derived, and finally interference to a reference signal in local DMRS reception is canceled based on a UE ID, a PRB index, transmit power, or instantaneous measurement of an H matrix.

It should be noted that this embodiment of the present invention is not limited to a low-frequency system and may be applied to a high-frequency millimeter wave system. Therefore, all of the foregoing involved reference signals, scheduling information, interference measurement, and the like may be based on beamforming (beamforming).

In this embodiment of the present invention, in the method described in FIG. 2, a base station can transmit a reference signal on a flexible frequency band, thereby effectively reducing interference between reference signals between neighboring cells in the flexible duplex system.

Figure 3:
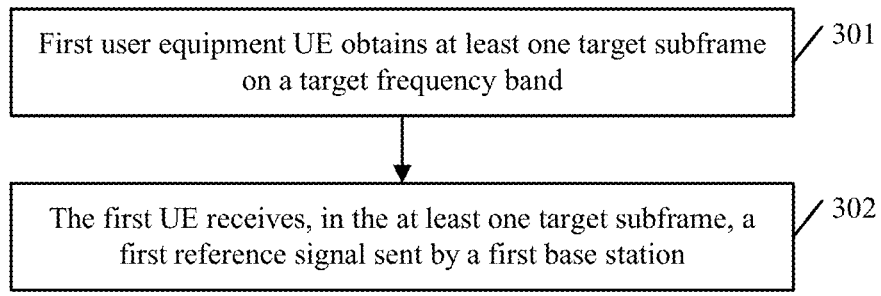
FIG. 3 is a schematic flowchart of another reference signal transmission method disclosed in an embodiment of the present invention.

Based on the application scenario shown in FIG. 1, an embodiment of the present invention discloses another reference signal transmission method. With reference to FIG. 3, FIG. 3 is a schematic flowchart of another reference signal transmission method disclosed in an embodiment of the present invention. The reference signal transmission method is described from a perspective of first UE. The reference signal transmission method may be applied to a flexible duplex system. As shown in FIG. 3, the reference signal transmission method may include the following steps.

301. The first UE obtains at least one target subframe on a target frequency band.

In this embodiment of the present invention, the target frequency band is a frequency band whose uplink and downlink transmission directions are configurable, namely, a flexible frequency band. The target frequency band may be a carrier or a partial frequency band on a carrier. Uplink-downlink timeslot configurations and/or transmission directions of a first base station and a neighboring second base station in the at least one target subframe are different, where the first base station is a base station to which the first UE belongs, the first UE may be edge UE of the first base station, and the first base station is neighboring to the second base station.

In this embodiment of the present invention, the first UE may receive indication information sent by the first base station. The indication information is used to indicate the at least one target subframe on the target frequency band.

302. The first UE receives, in the at least one target subframe, a first reference signal sent by a first base station.

In this embodiment of the present invention, the first reference signal may include but is not limited to at least one of a demodulation reference signal DMRS, a sounding reference signal SRS, a predetermined sequence, a first predetermined reference signal, and the like.

In this embodiment of the present invention, the method described in FIG. 3 may further include the following step:

(30) the first UE receives target configuration information sent by the first base station.

In this embodiment of the present invention, the target configuration information may be used to indicate a measurement subframe and/or first scheduling information that is intended for second UE, the measurement subframe is a subframe in which interference measurement is performed between the first UE and the second UE, the second UE is UE that is under the second base station and that causes interference to the first UE, and the first scheduling information is sent to the first base station by the second base station by using an X2 interface or by broadcasting.

The first scheduling information is uplink scheduling information, first predetermined scheduling information, or the like. The first scheduling information may include but is not limited to at least one of an identity of the second UE, an identity of a physical resource block PRB occupied by the second UE, and transmit power of the second UE.

In an optional implementation, the first UE receives the target configuration information that is sent by the first base station by using signaling. The signaling may include but is not limited to one of radio resource control RRC signaling, media access control MAC signaling, physical layer signaling, and the like.

Correspondingly, the method described in FIG. 3 may further include the following step:

(31) the first UE performs, in the measurement subframe, measurement on a first signal transmitted by the second UE, to obtain a measurement result.

The first signal may include but is not limited to at least one of a DMRS, an SRS, a sequence code, a preamble, a third predetermined reference signal, and the like.

Optionally, the method described in FIG. 3 may further include the following step:

(32) the first UE determines interference measurement information based on the measurement result.

The interference measurement information may be an interference matrix, in other words, be expressed in a form of a matrix.

Optionally, the method described in FIG. 3 may further include the following step:

(33) the first UE sends the interference measurement information or the measurement result to the first base station.

Correspondingly, the method described in FIG. 3 may further include the following step:

(34) the first UE receives second scheduling information that is determined by the first base station based on the interference measurement information or the measurement result and/or the first scheduling information.

The first base station may determine, based on the interference measurement information or the measurement result and/or the first scheduling information, the second scheduling information that is intended for the first UE. The second scheduling information may be downlink scheduling information, second predetermined scheduling information, or the like.

Optionally, the method described in FIG. 3 may further include the following step:

(35) the first UE cancels or suppresses signal interference from the second UE based on the second scheduling information.

Optionally, the method described in FIG. 3 may further include the following step:

(36) the first UE sends an interference cancellation capability of the first UE to the first base station.

Correspondingly, a specific implementation of step (34) that the first UE receives the second scheduling information that is determined by the first base station based on the interference measurement information or the measurement result and/or the first scheduling information may be:

the first UE receives the second scheduling information that is determined by the first base station based on at least one of the interference measurement information or the measurement result, the first scheduling information, and the interference cancellation capability of the first UE.

In this embodiment of the present invention, by performing the method described in FIG. 3, UE can receive, on a flexible frequency band, a reference signal transmitted by a base station, thereby effectively reducing interference between reference signals between neighboring cells in the flexible duplex system.

Figure 4:
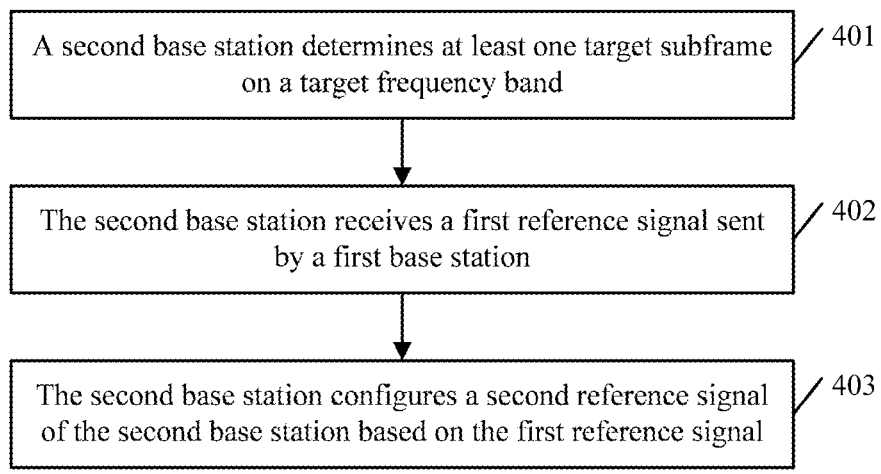
FIG. 4 is a schematic flowchart of another reference signal transmission method disclosed in an embodiment of the present invention.

Based on the application scenario shown in FIG. 1, an embodiment of the present invention discloses another reference signal transmission method. With reference to FIG. 4, FIG. 4 is a schematic flowchart of another reference signal transmission method disclosed in an embodiment of the present invention. The reference signal transmission method is described from a perspective of a second base station. The reference signal transmission method may be applied to a flexible duplex system. As shown in FIG. 4, the reference signal transmission method may include the following steps.

401. The second base station determines at least one target subframe on a target frequency band.

In this embodiment of the present invention, the target frequency band is a frequency band whose uplink and downlink transmission directions are configurable, namely, a flexible frequency band. Uplink-downlink timeslot configurations and/or transmission directions of the second base station and a neighboring first base station in the at least one target subframe are different. The target frequency band may be a carrier or a partial frequency band on a carrier.

402. The second base station receives a first reference signal sent by a first base station.

In this embodiment of the present invention, the first reference signal is a reference signal configured by the first base station in the at least one target subframe for UE under the first base station. The first reference signal may include but is not limited to at least one of a demodulation reference signal DMRS, a sounding reference signal SRS, a predetermined sequence, a first predetermined reference signal, and the like. Specifically, the second base station may receive the first reference signal that is sent by the first base station by using an X2 interface.

403. The second base station configures a second reference signal of the second base station based on the first reference signal.

In this embodiment of the present invention, the second reference signal may include but is not limited to at least one of an uplink DMRS, an uplink SRS, a second predetermined reference signal, and the like. A specific implementation of that the second base station configures the second reference signal based on the first reference signal is: configuring the second reference signal to be orthogonal to the first reference signal.

In an optional implementation, the method described in FIG. 4 may further include the following step:

(40) the second base station sends the second reference signal to the first base station, so that the first base station updates the first reference signal based on the second reference signal; or

(41) the second base station sends configuration information of the second reference signal to the first base station, so that the first base station updates the first reference signal based on the configuration information of the second reference signal.

The configuration information of the second reference signal may include but is not limited to at least one of a sequence length, a cyclic shift, a format of downlink control information DCI, a cell identity, an initial value of a Zadoff-Chu sequence, an orthogonal code, and the like that are of the second reference signal.

In an optional implementation, the method described in FIG. 4 may further include the following step:

(42) the second base station determines a measurement subframe from the at least one target subframe.

The measurement subframe is a subframe in which interference measurement is performed between first UE and second UE, the first UE is UE under the first base station and may be edge UE under the first base station, and the second UE is UE that is under the second base station and that causes interference to the first UE, and may be edge UE under the second base station.

Optionally, a specific implementation of that the second base station determines the second UE may be: The second base station determines the second UE based on at least one parameter of an RSRP parameter, an RSSI parameter, and an RSRQ parameter.

Optionally, a specific implementation of step (42) that the second base station determines the measurement subframe from the at least one target subframe may include the following step:

(42a) the second base station determines the measurement subframe from the at least one target subframe through Operation Administration and Maintenance OAM; or (42b) the second base station determines the measurement subframe from the at least one target subframe through negotiation with the first base station; or (42c) the second base station receives the measurement subframe sent by the first base station.

In an optional implementation, the method described in FIG. 4 may further include the following step:

(43) the second base station sends target configuration information to the second UE.

The target configuration information is used to indicate the measurement subframe and/or first scheduling information that is intended for the second UE, so that the second UE sends a first signal in the measurement subframe. The first signal is used to instruct the first UE to measure interference between the first UE and the second UE. The first scheduling information may be uplink scheduling information or first predetermined scheduling information. The first scheduling information may include but is not limited to at least one of an identity of the second UE, an identity of a physical resource block PRB occupied by the second UE, transmit power of the second UE, and the like. The first scheduling information may be sent to the second UE by the second base station, or may be preconfigured by the second UE. The first signal may include but is not limited to at least one of a DMRS, an SRS, a sequence code, a preamble, a third predetermined reference signal, and the like.

Specifically, the second base station sends the target configuration information to the second UE by using signaling. The signaling may include but is not limited to one of radio resource control RRC signaling, media access control MAC signaling, physical layer signaling, and the like.

Optionally, the method described in FIG. 4 may further include the following step:

(44) the second base station sends the first scheduling information to the first base station, so that the first base station determines, based on the first scheduling information, second scheduling information that is intended for the first UE, where the second scheduling information is used to instruct the first UE to cancel or suppress signal interference from the second UE.

The second scheduling information may be downlink scheduling information, second predetermined scheduling information, or the like.

In this embodiment of the present invention, by performing the method described in FIG. 4, a base station can receive a downlink reference signal that is configured by a neighboring base station on a flexible frequency band, and configure an uplink reference signal of the base station based on the downlink reference signal, thereby effectively reducing interference between reference signals between neighboring cells in the flexible duplex system.

Figure 5:
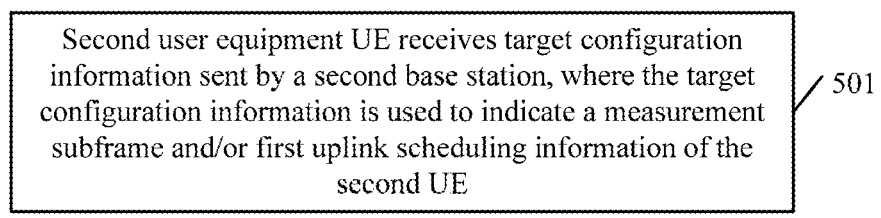
FIG. 5 is a schematic flowchart of still another reference signal transmission method disclosed in an embodiment of the present invention.

Based on the application scenario shown in FIG. 1, an embodiment of the present invention discloses still another reference signal transmission method. With reference to FIG. 5, FIG. 5 is a schematic flowchart of still another reference signal transmission method disclosed in an embodiment of the present invention. The reference signal transmission method is described from a perspective of second UE. The reference signal transmission method may be applied to a flexible duplex system. As shown in FIG. 5, the reference signal transmission method may include the following steps.

501. The second user equipment UE receives target configuration information sent by a second base station.

In this embodiment of the present invention, the target configuration information may be used to indicate a measurement subframe and/or first scheduling information of the second UE, the measurement subframe is a subframe in which interference measurement is performed between first UE and the second UE, the second base station is a base station to which the second UE belongs, the second UE may be edge UE of the second base station, the first UE is UE that is under a first base station neighboring to the second base station and that causes interference to the second UE, and the first UE may be edge UE of the first base station.

In this embodiment of the present invention, the first scheduling information may be uplink scheduling information, first predetermined scheduling information, or the like. The first scheduling information may include but is not limited to at least one of an identity of the second UE, an identity of a physical resource block PRB occupied by the second UE, transmit power of the second UE, and the like. The first scheduling information may be sent to the second UE by the second base station, or may be preconfigured by the second UE.

Specifically, the second UE may receive the target configuration information that is sent by the second base station by using signaling. The signaling may include but is not limited to one of radio resource control RRC signaling, media access control MAC signaling, physical layer signaling, and the like.

In an optional implementation, the method described in FIG. 5 may further include the following step:

(50) the second UE sends a first signal in the measurement subframe based on the first scheduling information.

The first signal may be used to instruct the first UE to measure interference between the first UE and the second UE. The first signal may include but is not limited to at least one of a demodulation reference signal DMRS, a demodulation reference signal SRS, a sequence code, a preamble, a third predetermined reference signal, and the like.

In this embodiment of the present invention, by performing the method described in FIG. 5, UE can receive configuration information sent by a base station, so that the UE can send a signal in a measurement subframe, and neighboring UE can measure interference caused by the signal, thereby effectively reducing interference between reference signals between neighboring cells.

Figure 6:
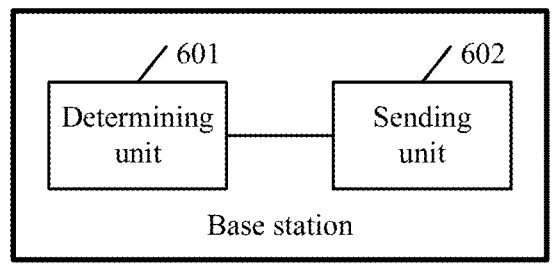
FIG. 6 is a schematic structural diagram of a base station disclosed in an embodiment of the present invention.

Based on the application scenario shown in FIG. 1, an embodiment of the present invention discloses a base station. With reference to FIG. 6, FIG. 6 is a schematic structural diagram of a base station disclosed in an embodiment of the present invention. The base station is configured to perform a reference signal transmission method disclosed in an embodiment of the present invention. The base station is the first base station involved in the foregoing embodiments. As shown in FIG. 6, the base station may include:

a determining unit 601, configured to determine at least one target subframe on a target frequency band, where the target frequency band is a frequency band whose uplink and downlink transmission directions are configurable, and uplink-downlink timeslot configurations and/or transmission directions of the base station and a neighboring second base station in the at least one target subframe are different; and a sending unit 602, configured to send a first reference signal to first UE in the at least one target subframe, where the first UE is UE under the base station.

In this embodiment of the present invention, the first reference signal may include but is not limited to at least one of a demodulation reference signal DMRS, a sounding reference signal SRS, a first predetermined reference signal, and the like.

Figure 7:
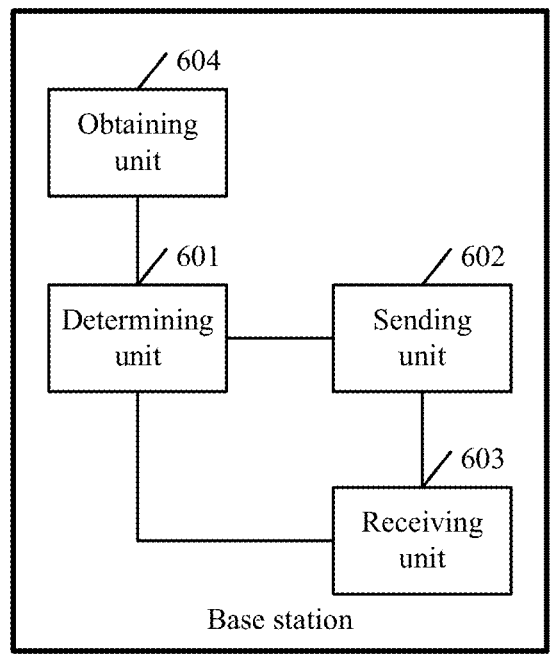
FIG. 7 is a schematic structural diagram of another base station disclosed in an embodiment of the present invention.

With further reference to FIG. 7, FIG. 7 is a schematic structural diagram of another base station disclosed in an embodiment of the present invention. The base station is configured to perform a reference signal transmission method disclosed in an embodiment of the present invention. The base station shown in FIG. 7 is obtained through further optimization of the base station shown in FIG. 6. Compared with the base station shown in FIG. 6, the base station shown in FIG. 7 may further include:

a receiving unit 603, configured to: before the sending unit 602 sends the first reference signal to the first user equipment UE in the at least one target subframe, receive a second reference signal sent by the second base station, and configure the first reference signal based on the second reference signal; or receive configuration information that is of a second reference signal and that is sent by the second base station, and configure the first reference signal based on the configuration information of the second reference signal.

The second reference signal is a reference signal configured by the second base station in the at least one target subframe for UE under the second base station. The second reference signal may include but is not limited to at least one of an uplink DMRS, an uplink SRS, and a second predetermined reference signal. The configuration information of the second reference signal may include but is not limited to at least one of a sequence length, a cyclic shift, a format of downlink control information DCI, a cell identity, an initial value of a Zadoff-Chu sequence, and an orthogonal code that are of the second reference signal.

In this embodiment of the present invention, the first reference signal is configured to be orthogonal to the second reference signal.

In an optional implementation, the sending unit 602 may be further configured to: send the first reference signal to the second base station, so that the second base station updates the second reference signal based on the first reference signal; or send configuration information of the first reference signal to the second base station, so that the second base station updates the second reference signal based on the configuration information of the first reference signal.

The configuration information of the first reference signal may include but is not limited to at least one of a sequence length, a cyclic shift, a format of downlink control information DCI, a cell identity, an initial value of a Zadoff-Chu sequence, an orthogonal code, and the like that are of the first reference signal.

In this embodiment of the present invention, the determining unit 601 may be further configured to determine a measurement subframe from the at least one target subframe. The measurement subframe is a subframe in which interference measurement is performed between the first UE and second UE. The second UE is UE that is under the second base station and that causes interference to the first UE.

Optionally, a specific implementation of that the determining unit 601 determines the measurement subframe from the at least one target subframe may be:

the determining unit 601 determines the measurement subframe from the at least one target subframe through Operation Administration and Maintenance OAM; or the determining unit 601 determines the measurement subframe from the at least one target subframe through negotiation with the second base station; or the determining unit 601 receives the measurement subframe sent by the second base station.

Optionally, the receiving unit 603 may be further configured to receive first scheduling information that is intended for the second UE and that is sent by the second base station.

The sending unit 602 may be further configured to send target configuration information to the first UE. The target configuration information is used to indicate the measurement subframe and/or the first scheduling information, so that the first UE performs, in the measurement subframe, measurement on a first signal transmitted by the second UE, to obtain a measurement result, and determines interference measurement information based on the measurement result.

Specifically, the sending unit 602 may send the target configuration information to the first UE by using signaling. The signaling includes one of radio resource control RRC signaling, media access control MAC signaling, physical layer signaling, and the like.

The first scheduling information is uplink scheduling information or first predetermined scheduling information. The first scheduling information may include but is not limited to at least one of an identity of the second UE, an identity of a physical resource block PRB occupied by the second UE, transmit power of the second UE, and the like. The first signal may include but is not limited to at least one of a DMRS, an SRS, a sequence code, a preamble, a third predetermined reference signal, and the like.

The receiving unit 603 may be further configured to receive the interference measurement information or the measurement result sent by the first UE.

The determining unit 601 may be further configured to: determine second scheduling information based on the interference measurement information or the measurement result and/or the first scheduling information, and send the second scheduling information to the first UE, so that the first UE cancels or suppresses signal interference from the second UE based on the second scheduling information.

The second scheduling information may be downlink scheduling information or second predetermined scheduling information. The interference measurement information may be an interference matrix.

In an optional implementation, the base station shown in FIG. 7 may further include:

an obtaining unit 604, configured to obtain an interference cancellation capability of the first UE.

A specific implementation of that the determining unit 601 determines the second scheduling information based on the interference measurement information or the measurement result and/or the first scheduling information may be:

the determining unit 601 determines the second scheduling information based on at least one of the interference measurement information or the measurement result, the first scheduling information, and the interference cancellation capability of the first UE.

In this embodiment of the present invention, by implementing the base stations shown in FIG. 6 and FIG. 7, a base station can transmit a reference signal on a flexible frequency band, thereby effectively reducing interference between reference signals between neighboring cells in a flexible duplex system.

Figure 8:
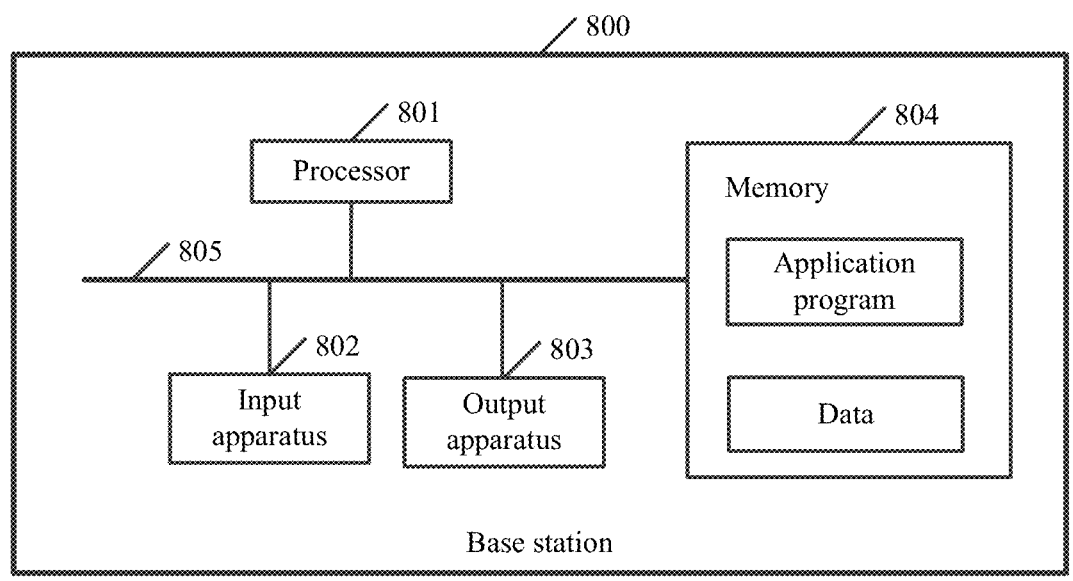
FIG. 8 is a schematic structural diagram of another base station disclosed in an embodiment of the present invention.

Based on the application scenario shown in FIG. 1, an embodiment of the present invention discloses another base station. With reference to FIG. 8, FIG. 8 is a schematic structural diagram of another base station disclosed in an embodiment of the present invention. The base station is configured to perform a reference signal transmission method disclosed in an embodiment of the present invention. The base station is the first base station involved in the foregoing embodiments. As shown in FIG. 8, the base station 800 may include components such as at least one processor 801, for example, a CPU (Central Processing Unit, central processing unit), at least one input apparatus 802, at least one output apparatus 803, and a memory 804. These components may be connected by using one or more buses 805, for communication. A person skilled in the art may understand that a structure of the base station shown in FIG. 8 does not constitute any limitation on this embodiment of the present invention. The base station may have a bus structure, or may have a star structure. The base station may further include components more or fewer than those shown in the figure, or in the base station, some components are combined, or the components are disposed differently.

In this embodiment of the present invention, the input apparatus 802 may include a wired interface, a wireless interface, or the like, and may be configured to receive data transmitted by UE in an uplink direction, receive information transmitted by a neighboring base station, or the like. The output apparatus 803 may include a wired interface, a wireless interface, or the like, and may be configured to transmit a signal to UE in a downlink direction, send a signal to a neighboring base station, or the like.

In this embodiment of the present invention, the memory 804 may be a high-speed RAM memory, or may be a nonvolatile memory (nonvolatile memory), for example, at least one magnetic disk memory. Optionally, the memory 804 may further be at least one storage apparatus located far away from the processor 801. As shown in FIG. 8, the memory 804 may include an application program, data, and the like. This is not limited in this embodiment of the present invention.

In the base station shown in FIG. 8, the processor 801 may be configured to call the application program stored in the memory 804 to perform the following operations:

determining at least one target subframe on a target frequency band, where the target frequency band is a frequency band whose uplink and downlink transmission directions are configurable, and uplink-downlink timeslot configurations and/or transmission directions of the base station 800 and a neighboring second base station in the at least one target subframe are different; and triggering the output apparatus 803 to send a first reference signal to first UE in the at least one target subframe, where the first UE is UE under the base station 800.

The first reference signal may include but is not limited to at least one of a demodulation reference signal DMRS, a sounding reference signal SRS, and a first predetermined reference signal.

Specifically, the base station shown in FIG. 8 may be configured to implement some or all of the processes in the method described in FIG. 2 in the embodiments of the present invention.

Figure 9:
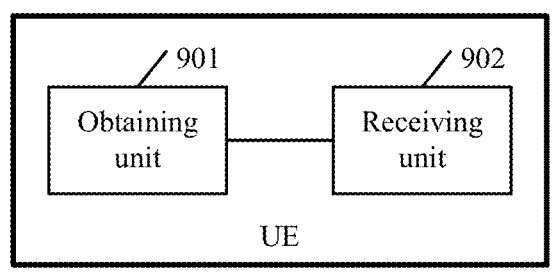
FIG. 9 is a schematic structural diagram of UE disclosed in an embodiment of the present invention.

Based on the application scenario shown in FIG. 1, an embodiment of the present invention discloses UE. With reference to FIG. 9, FIG. 9 is a schematic structural diagram of UE disclosed in an embodiment of the present invention. The UE is configured to perform a reference signal transmission method disclosed in an embodiment of the present invention. The UE is the first UE involved in the foregoing embodiments. As shown in FIG. 9, the UE may include:

an obtaining unit 901, configured to obtain at least one target subframe on a target frequency band, where the target frequency band is a frequency band whose uplink and downlink transmission directions are configurable, uplink-downlink timeslot configurations and/or transmission directions of a first base station and a neighboring second base station in the at least one target subframe are different, and the first base station is a base station to which the UE belongs; and a receiving unit 902, configured to receive, in the at least one target subframe, a first reference signal sent by the first base station.

The first reference signal may include but is not limited to at least one of a demodulation reference signal DMRS, a sounding reference signal SRS, a first predetermined reference signal, and the like.

Optionally, the receiving unit 902 may be further configured to receive target configuration information sent by the first base station. The target configuration information is used to indicate a measurement subframe and/or first scheduling information that is intended for second UE. The measurement subframe is a subframe in which interference measurement is performed between the UE and the second UE. The second UE is UE that is under the second base station and that causes interference to the UE. The first scheduling information is sent to the first base station by the second base station.

Optionally, the receiving unit 902 may receive the target configuration information that is sent by the first base station by using signaling. The signaling may include but is not limited to one of radio resource control RRC signaling, media access control MAC signaling, physical layer signaling, and the like.

The first scheduling information may be uplink scheduling information or first predetermined scheduling information. The first scheduling information may include but is not limited to at least one of an identity of the second UE, an identity of a physical resource block PRB occupied by the second UE, transmit power of the second UE, and the like.

Figure 10:
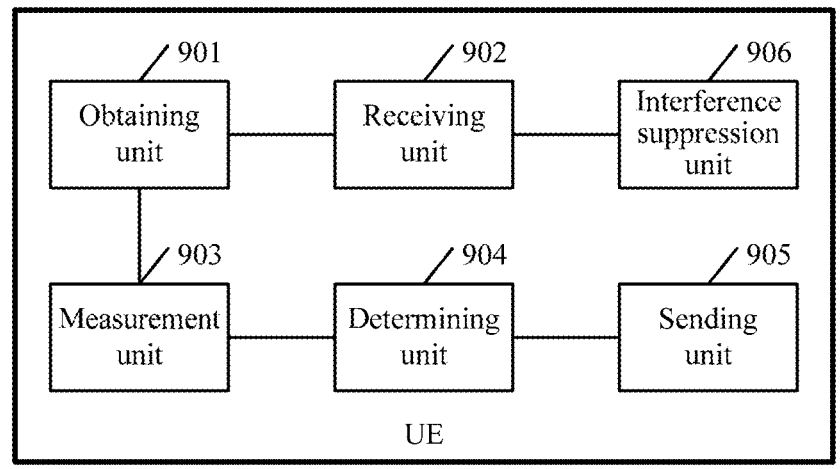
FIG. 10 is a schematic structural diagram of another UE disclosed in an embodiment of the present invention.

With further reference to FIG. 10, FIG. 10 is a schematic structural diagram of another UE disclosed in an embodiment of the present invention. The UE is configured to perform a reference signal transmission method disclosed in an embodiment of the present invention. The UE shown in FIG. 10 is obtained through further optimization of the UE shown in FIG. 9. Compared with the UE shown in FIG. 9, the UE shown in FIG. 10 may further include:

a measurement unit 903, configured to perform, in the measurement subframe, measurement on a first signal transmitted by the second UE, to obtain a measurement result.

The first signal may include but is not limited to at least one of a DMRS, an SRS, a sequence code, a preamble, and a third predetermined reference signal.

Correspondingly, the UE shown in FIG. 10 may further include:

a determining unit 904, configured to determine interference measurement information based on the measurement result; and a sending unit 905, configured to send the interference measurement information or the measurement result to the first base station.

The interference measurement information may be an interference matrix.

The receiving unit 902 may be further configured to receive second scheduling information that is determined by the first base station based on the interference measurement information or the measurement result and/or the first scheduling information.

Correspondingly, the UE shown in FIG. 10 may further include:

an interference suppression unit 906, configured to cancel or suppress signal interference from the second UE based on the second scheduling information.

The second scheduling information may be downlink scheduling information or second predetermined scheduling information.

The sending unit 905 may be further configured to send an interference cancellation capability of the UE to the first base station.

Correspondingly, a specific implementation of that the receiving unit 902 receives the second scheduling information that is determined by the first base station based on the interference measurement information or the measurement result and/or the first scheduling information may be:

the receiving unit 905 receives the second scheduling information that is determined by the first base station based on at least one of the interference measurement information or the measurement result, the first scheduling information, and the interference cancellation capability of the first UE.

In this embodiment of the present invention, by implementing the UEs shown in FIG. 9 and FIG. 10, UE can receive, on a flexible frequency band, a reference signal transmitted by a base station, thereby effectively reducing interference between reference signals between neighboring cells in a flexible duplex system.

Figure 11:
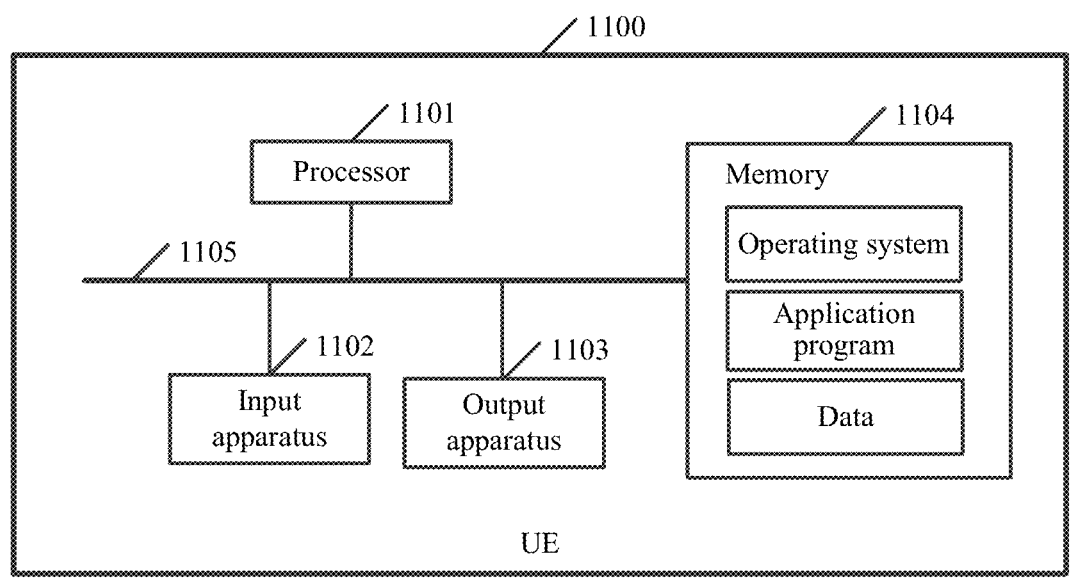
FIG. 11 is a schematic structural diagram of another UE disclosed in an embodiment of the present invention.

Based on the application scenario shown in FIG. 1, an embodiment of the present invention discloses another UE. With reference to FIG. 11, FIG. 11 is a schematic structural diagram of another UE disclosed in an embodiment of the present invention. The UE is configured to perform a reference signal transmission method disclosed in an embodiment of the present invention. The UE is the first UE involved in the foregoing embodiments. As shown in FIG. 11, the UE 1100 may include components such as at least one processor 1101, for example, a CPU, at least one input apparatus 1102, at least one output apparatus 1103, and a memory 1104. These components may be connected by using one or more buses 1105, for communication. A person skilled in the art may understand that a structure of the UE shown in FIG. 11 does not constitute any limitation on this embodiment of the present invention. The UE may have a bus structure, or may have a star structure. The UE may further include components more or fewer than those shown in the figure, or in the UE, some components are combined, or the components are disposed differently.

In this embodiment of the present invention, the input apparatus 1102 may include a wired interface, a wireless interface, or the like, and may be configured to receive a signal sent by a base station in a downlink direction, and the like. The output apparatus 1103 may include a wired interface, a wireless interface, or the like, and may be configured to transmit data to a base station in an uplink direction, and the like.

In this embodiment of the present invention, the memory 1104 may be a high-speed RAM memory, or may be a nonvolatile memory (nonvolatile memory), for example, at least one magnetic disk memory. Optionally, the memory 1104 may further be at least one storage apparatus located far away from the processor 1101. As shown in FIG. 11, as a computer storage medium, the memory 1104 may include an operating system, an application program, data, and the like. This is not limited in this embodiment of the present invention.

In the UE shown in FIG. 11, the processor 1101 may be configured to call the application program stored in the memory 1104 to perform the following operations:

obtaining at least one target subframe on a target frequency band, where the target frequency band is a frequency band whose uplink and downlink transmission directions are configurable, uplink-downlink timeslot configurations and/or transmission directions of a first base station and a neighboring second base station in the at least one target subframe are different, and the first base station is a base station to which the UE 1100 belongs; and triggering the input apparatus 1102 to receive, in the at least one target subframe, a first reference signal sent by the first base station.

The first reference signal may include but is not limited to at least one of a demodulation reference signal DMRS, a sounding reference signal SRS, and a first predetermined reference signal.

Specifically, the UE shown in FIG. 11 may be configured to implement some or all of the processes in the method described in FIG. 3 in the embodiments of the present invention.

Figure 12:
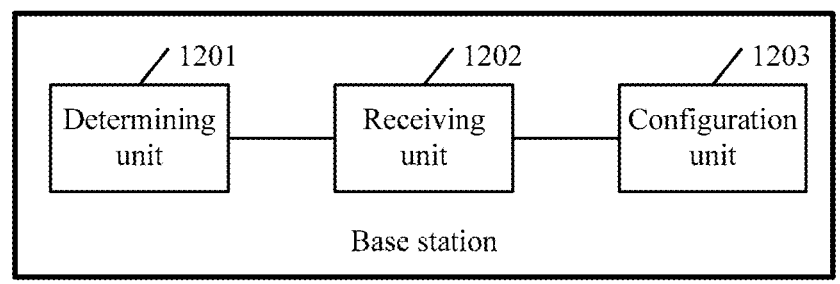
FIG. 12 is a schematic structural diagram of another base station disclosed in an embodiment of the present invention.

Based on the application scenario shown in FIG. 1, an embodiment of the present invention discloses another base station. With reference to FIG. 12, FIG. 12 is a schematic structural diagram of another base station disclosed in an embodiment of the present invention. The base station is configured to perform a reference signal transmission method disclosed in an embodiment of the present invention. The base station is the second base station involved in the foregoing embodiments. As shown in FIG. 12, the base station may include:

a determining unit 1201, configured to determine at least one target subframe on a target frequency band, where the target frequency band is a frequency band whose uplink and downlink transmission directions are configurable, and uplink-downlink timeslot configurations and/or transmission directions of the base station and a neighboring first base station in the at least one target subframe are different;

a receiving unit 1202, configured to receive a first reference signal sent by the first base station, where the first reference signal is a reference signal configured by the first base station in the at least one target subframe for UE under the first base station; and a configuration unit 1203, configured to configure a second reference signal of the base station based on the first reference signal.

The first reference signal may include but is not limited to at least one of a demodulation reference signal DMRS, a sounding reference signal SRS, and a first predetermined reference signal. The second reference signal may include but is not limited to at least one of an uplink DMRS, an uplink SRS, and a second predetermined reference signal. The second reference signal is configured to be orthogonal to the first reference signal.

Figure 13:
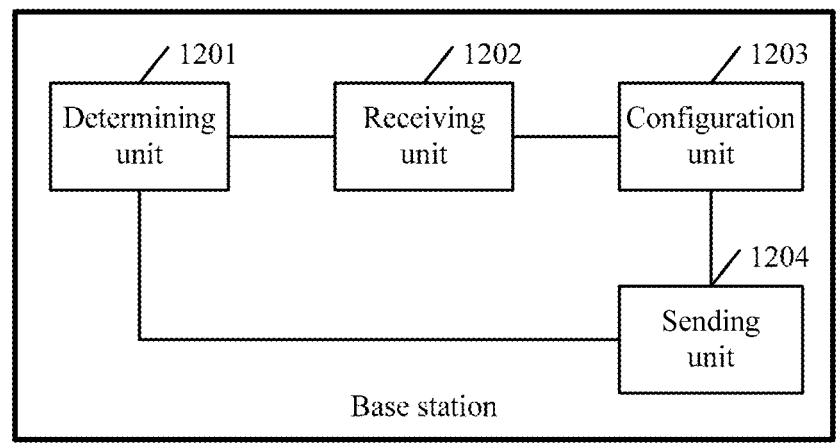
FIG. 13 is a schematic structural diagram of another base station disclosed in an embodiment of the present invention.

With further reference to FIG. 13, FIG. 13 is a schematic structural diagram of another base station disclosed in an embodiment of the present invention. The base station is configured to perform a reference signal transmission method disclosed in an embodiment of the present invention. The base station shown in FIG. 13 is obtained through further optimization of the base station shown in FIG. 12. Compared with the base station shown in FIG. 12, the base station shown in FIG. 13 may further include:

a sending unit 1204, configured to: send the second reference signal to the first base station, so that the first base station updates the first reference signal based on the second reference signal; or send configuration information of the second reference signal to the first base station, so that the first base station updates the first reference signal based on the configuration information of the second reference signal.

The configuration information of the second reference signal may include but is not limited to at least one of a sequence length, a cyclic shift, a format of downlink control information DCI, a cell identity, an initial value of a Zadoff-Chu sequence, and an orthogonal code that are of the second reference signal.

Optionally, the determining unit 1201 may be further configured to determine a measurement subframe from the at least one target subframe. The measurement subframe is a subframe in which interference measurement is performed between first UE and second UE. The first UE is UE under the first base station. The second UE is UE that is under the base station and that causes interference to the first UE.

Optionally, a specific implementation of that the determining unit 1201 determines the measurement subframe from the at least one target subframe may be:

the determining unit 1201 determines the measurement subframe from the at least one target subframe through Operation Administration and Maintenance OAM; or the determining unit 1201 determines the measurement subframe from the at least one target subframe through negotiation with the first base station; or the determining unit 1201 receives the measurement subframe sent by the first base station.

The sending unit 1204 may be further configured to send target configuration information to the second UE. The target configuration information is used to indicate the measurement subframe and/or first scheduling information that is intended for the second UE, so that the second UE sends a first signal in the measurement subframe. The first signal is used to instruct the first UE to measure interference between the first UE and the second UE.

The first scheduling information may be uplink scheduling information or first predetermined scheduling information. The first scheduling information may include but is not limited to at least one of an identity of the second UE, an identity of a physical resource block PRB occupied by the second UE, and transmit power of the second UE. The first signal may include but is not limited to at least one of a DMRS, an SRS, a sequence code, a preamble, and a third predetermined reference signal.

Specifically, the sending unit 1204 may send the target configuration information to the second UE by using signaling. The signaling may include but is not limited to one of radio resource control RRC signaling, media access control MAC signaling, and physical layer signaling.

Optionally, the sending unit 1204 may be further configured to send the first scheduling information to the first base station, so that the first base station determines, based on the first scheduling information, second scheduling information that is intended for the first UE. The second scheduling information is used to instruct the first UE to cancel or suppress signal interference from the second UE.

The second scheduling information may be downlink scheduling information or second predetermined scheduling information.

In this embodiment of the present invention, by implementing the base stations shown in FIG. 12 and FIG. 13, a base station can receive a downlink reference signal that is configured by a neighboring base station on a flexible frequency band, and configure an uplink reference signal of the base station based on the downlink reference signal, thereby effectively reducing interference between reference signals between neighboring cells in a flexible duplex system.

Figure 14:
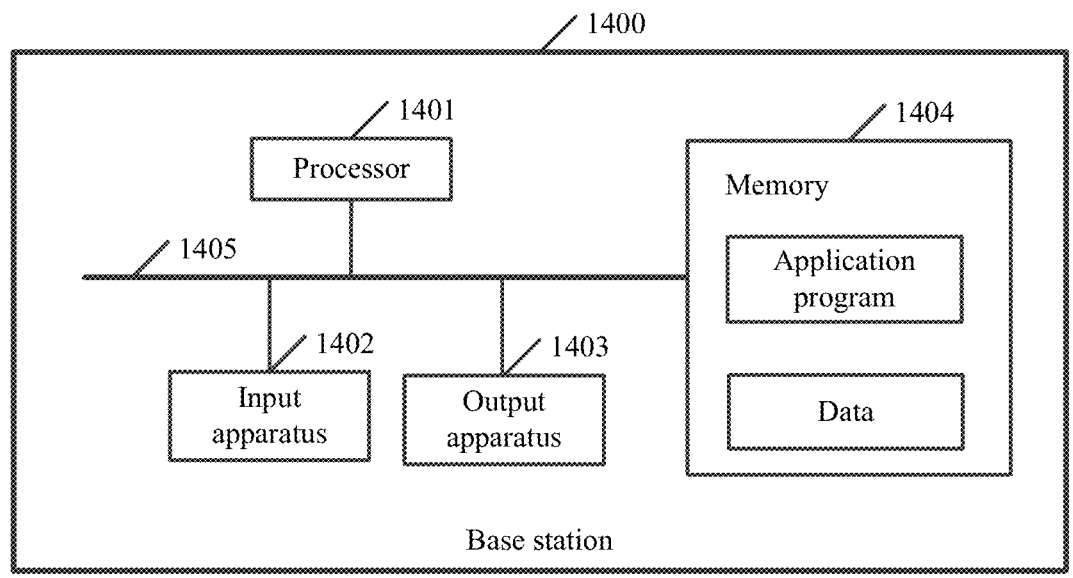
FIG. 14 is a schematic structural diagram of still another base station disclosed in an embodiment of the present invention.

Based on the application scenario shown in FIG. 1, an embodiment of the present invention discloses still another base station. With reference to FIG. 14, FIG. 14 is a schematic structural diagram of still another base station disclosed in an embodiment of the present invention. The base station is configured to perform a reference signal transmission method disclosed in an embodiment of the present invention. The base station is the second base station involved in the foregoing embodiments. As shown in FIG. 14, the base station 1400 may include components such as at least one processor 1401, for example, a CPU, at least one input apparatus 1402, at least one output apparatus 1403, and a memory 1404. These components may be connected by using one or more buses 1405, for communication. A person skilled in the art may understand that a structure of the base station 1400 shown in FIG. 14 does not constitute any limitation on this embodiment of the present invention. The base station may have a bus structure, or may have a star structure. The base station may further include components more or fewer than those shown in the figure, or in the base station, some components are combined, or the components are disposed differently.

In this embodiment of the present invention, the input apparatus 1402 may include a wired interface, a wireless interface, or the like, and may be configured to receive data transmitted by UE in an uplink direction, receive information transmitted by a neighboring base station, or the like. The output apparatus 1403 may include a wired interface, a wireless interface, or the like, and may be configured to transmit a signal to UE in a downlink direction, send a signal to a neighboring base station, or the like.

In this embodiment of the present invention, the memory 1404 may be a high-speed RAM memory, or may be a nonvolatile memory (nonvolatile memory), for example, at least one magnetic disk memory. Optionally, the memory 1404 may further be at least one storage apparatus located far away from the processor 1401. As shown in FIG. 14, the memory 1404 may include an application program, data, and the like. This is not limited in this embodiment of the present invention.

In the base station 1400 shown in FIG. 14, the processor 1401 may be configured to call the application program stored in the memory 1404 to perform the following operations:

determining at least one target subframe on a target frequency band, where the target frequency band is a frequency band whose uplink and downlink transmission directions are configurable, and uplink-downlink timeslot configurations and/or transmission directions of the base station and a neighboring first base station in the at least one target subframe are different;

triggering the input apparatus 1402 to receive a first reference signal sent by the first base station, where the first reference signal is a reference signal configured by the first base station in the at least one target subframe for UE under the first base station; and configuring a second reference signal of the base station based on the first reference signal.

The first reference signal may include but is not limited to at least one of a demodulation reference signal DMRS, a sounding reference signal SRS, and a first predetermined reference signal. The second reference signal may include but is not limited to at least one of an uplink DMRS, an uplink SRS, and a second predetermined reference signal. The second reference signal is configured to be orthogonal to the first reference signal.

Specifically, the base station shown in FIG. 14 may be configured to implement some or all of the processes in the method described in FIG. 4 in the embodiments of the present invention.

Figure 15:
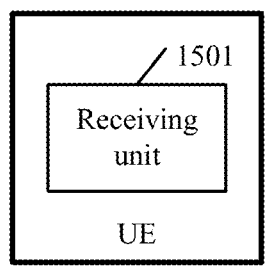
FIG. 15 is a schematic structural diagram of another UE disclosed in an embodiment of the present invention.

Based on the application scenario shown in FIG. 1, an embodiment of the present invention discloses another UE. With reference to FIG. 15, FIG. 15 is a schematic structural diagram of another UE disclosed in an embodiment of the present invention. The UE is configured to perform a reference signal transmission method disclosed in an embodiment of the present invention. The UE is the second UE involved in the foregoing embodiments. As shown in FIG. 15, the UE may include:

a receiving unit 1501, configured to receive target configuration information sent by a second base station, where the target configuration information is used to indicate a measurement subframe and/or first scheduling information of the UE, the measurement subframe is a subframe in which interference measurement is performed between first UE and the UE, the second base station is a base station to which the UE belongs, and the first UE is UE that is under a first base station neighboring to the second base station and that is interfered by the UE.

Optionally, the receiving unit 1501 may receive the target configuration information that is sent by the send base station by using signaling. The signaling may include but is not limited to one of radio resource control RRC signaling, media access control MAC signaling, physical layer signaling, and the like.

Figure 16:
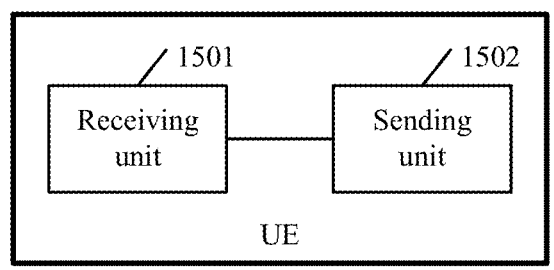
FIG. 16 is a schematic structural diagram of another UE disclosed in an embodiment of the present invention.

With further reference to FIG. 16, FIG. 16 is a schematic structural diagram of another UE disclosed in an embodiment of the present invention. The UE is configured to perform a reference signal transmission method disclosed in an embodiment of the present invention. The UE shown in FIG. 16 is obtained through further optimization of the UE shown in FIG. 15. Compared with the UE shown in FIG. 15, the UE shown in FIG. 16 may further include:

a sending unit 1502, configured to send a first signal in the measurement subframe based on the first scheduling information, where the first signal is used to instruct the first UE to measure interference between the first UE and the UE.

The first scheduling information may be uplink scheduling information or first predetermined scheduling information. The first scheduling information may include but is not limited to at least one of an identity of the second UE, an identity of a physical resource block PRB occupied by the second UE, transmit power of the second UE, and the like. The first signal may include but is not limited to at least one of a demodulation reference signal DMRS, a demodulation reference signal SRS, a sequence code, a preamble, and a third predetermined reference signal.

In this embodiment of the present invention, by implementing the UEs shown in FIG. 15 and FIG. 16, UE can receive configuration information sent by a base station, so that the UE can send a signal in a measurement subframe, and neighboring UE can measure interference caused by the signal, thereby effectively reducing interference between reference signals between neighboring cells.

Figure 17:
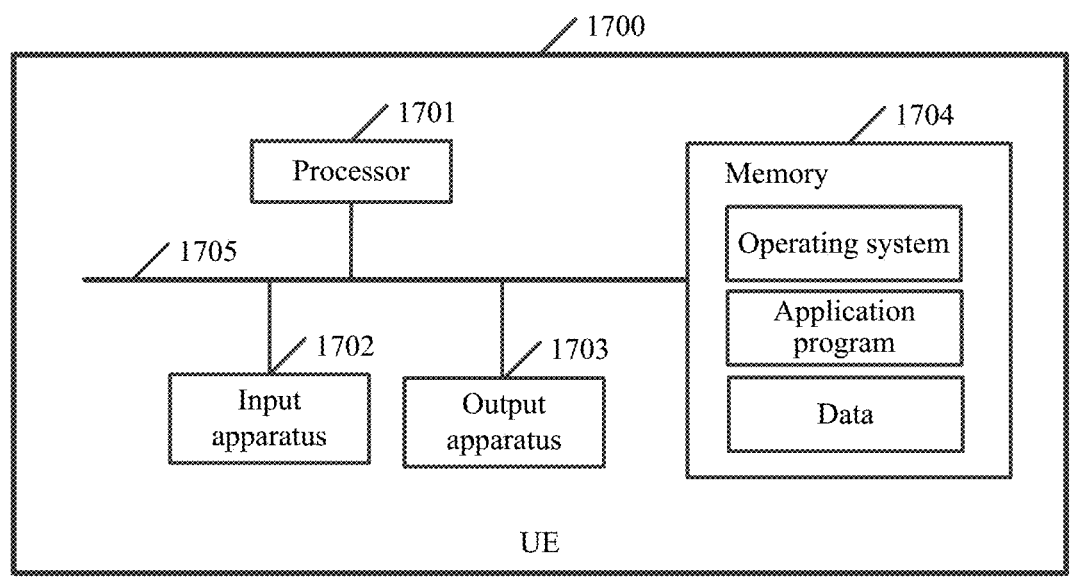
FIG. 17 is a schematic structural diagram of still another UE disclosed in an embodiment of the present invention.

Based on the application scenario shown in FIG. 1, an embodiment of the present invention discloses still another UE. With reference to FIG. 17, FIG. 17 is a schematic structural diagram of still another UE disclosed in an embodiment of the present invention. The UE is configured to perform a reference signal transmission method disclosed in an embodiment of the present invention. The UE 1700 is the second UE involved in the foregoing embodiments. As shown in FIG. 17, the UE 1700 may include components such as at least one processor 1701, for example, a CPU, at least one input apparatus 1702, at least one output apparatus 1703, and a memory 1704. These components may be connected by using one or more buses 1705, for communication. A person skilled in the art may understand that a structure of the UE 1700 shown in FIG. 17 does not constitute any limitation on this embodiment of the present invention. The UE may have a bus structure, or may have a star structure. The UE may further include components more or fewer than those shown in the figure, or in the UE, some components are combined, or the components are disposed differently.

In this embodiment of the present invention, the input apparatus 1702 may include a wired interface, a wireless interface, or the like, and may be configured to receive a signal sent by a base station in a downlink direction, and the like. The output apparatus 1703 may include a wired interface, a wireless interface, or the like, and may be configured to transmit data to a base station in an uplink direction, and the like.

In this embodiment of the present invention, the memory 1704 may be a high-speed RAM memory, or may be a nonvolatile memory (nonvolatile memory), for example, at least one magnetic disk memory. Optionally, the memory 1704 may further be at least one storage apparatus located far away from the processor 1701. As shown in FIG. 17, as a computer storage medium, the memory 1704 may include an operating system, an application program, data, and the like. This is not limited in this embodiment of the present invention.

In the UE 1700 shown in FIG. 17, the processor 1701 may be configured to call the application program stored in the memory 1704 to perform the following operation:

triggering the input apparatus 1702 to receive target configuration information sent by a second base station, where the target configuration information is used to indicate a measurement subframe and/or first scheduling information of the UE 1700, the measurement subframe is a subframe in which interference measurement is performed between first UE and the UE 1700, the second base station is a base station to which the UE 1700 belongs, and the first UE is UE that is under a first base station neighboring to the second base station and that is interfered by the UE 1700.

The first scheduling information may be uplink scheduling information or first predetermined scheduling information.

Specifically, the UE shown in FIG. 17 may be configured to implement some or all of the processes in the method described in FIG. 5 in the embodiments of the present invention.

Figure 18:
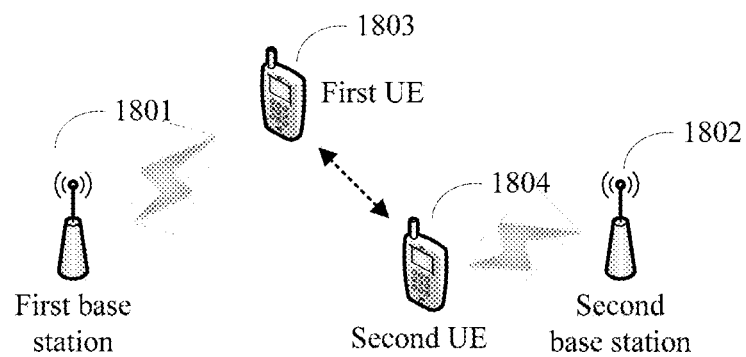
FIG. 18 is a schematic structural diagram of a reference signal transmission system disclosed in an embodiment of the present invention.

Based on the application scenario shown in FIG. 1, an embodiment of the present invention discloses a reference signal transmission system. With reference to FIG. 18, FIG. 18 is a schematic structural diagram of a reference signal transmission system disclosed in an embodiment of the present invention. The reference signal transmission system may include a first base station 1801, a second base station 1802, first UE 1803, and second UE 1804. The first UE 1803 may be one UE, or may be a plurality of UEs. The second UE 1804 may be one UE, or may be a plurality of UEs. In the reference signal transmission system, the first base station 1801 has a same structure and same functions as the first base station described in the foregoing embodiments, and is not described herein again; the second base station 1802 has a same structure and same functions as the second base station described in the foregoing embodiments, and is not described herein again; the first UE 1803 has a same structure and same functions as the first UE described in the foregoing embodiments, and is not described herein again; and the second UE 1804 has a same structure and same functions as the second UE described in the foregoing embodiments, and is not described herein again.

In an embodiment, this embodiment of the present invention further discloses a computer storage medium. The computer storage medium stores a computer program. When the computer program in the computer storage medium is read to a computer, the computer can perform all steps of a data transmission method disclosed in an embodiment of the present invention.

A module or a submodule in all the embodiments of the present invention may be implemented by using a universal integrated circuit, for example, a CPU, or by using an ASIC (Application-Specific Integrated Circuit, application-specific integrated circuit).

It should be noted that, for brief description, the foregoing method embodiments are represented as a series of actions. However, a person skilled in the art should know that the present invention is not limited to the described order of the actions, because according to the present invention, some steps may be performed in another order or simultaneously. In addition, a person skilled in the art should also know that all the embodiments described in this specification are example embodiments, and the related actions and modules are not necessarily mandatory to the present invention.

In the foregoing embodiments, the description about each embodiment has respective focuses. For a part that is not described in detail in an embodiment, reference may be made to related descriptions in other embodiments.

Based on an actual requirement, a sequence of the steps of the method in the embodiments of the present invention may be adjusted, and some steps may also be combined or deleted.

The units in the base station and the UE in the embodiments of the present invention may be combined, divided, or deleted based on an actual requirement.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, an optical disc, or the like.

The reference signal transmission method and the related device and system provided in the embodiments of the present invention are described in detail above. The principle and the implementations of the present invention are described in this specification by using specific examples. The descriptions about the embodiments are merely provided to help understand the method and the core idea of the present invention. In addition, a person of ordinary skill in the art can make changes to the specific implementations and the application scope according to the idea of the present invention. Therefore, the content of this specification shall not be construed as a limitation on the present invention.

What is claimed is:

1. A reference signal transmission method, comprising:
   determining, by a first base station, at least one target subframe on a target frequency band, wherein the target frequency band is a frequency band whose uplink and downlink transmission directions are configurable, and wherein the first base station and a neighboring second base station are different in at least one of uplink-downlink timeslot configurations or transmission directions of the at least one target subframe;
   receiving, by the first base station, configuration information that is of a second reference signal and that is sent by the second base station, wherein the second reference signal is a reference signal configured by the second base station in the at least one target subframe for user equipment (UE) served by the second base station; and
   sending, by the first base station, a first reference signal to a first UE in the at least one target subframe, wherein the first reference signal is configured by the first base station based on the second reference signal, wherein the first UE is an UE served by the first base station, wherein the first reference signal comprises a demodulation reference signal (DMRS) and the second reference signal comprises an uplink DMRS, and wherein the first reference signal is configured to be orthogonal to the second reference signal.

2. The method according to claim 1, wherein the first reference signal comprises at least one of a sounding reference signal (SRS), or a first predetermined reference signal.

3. The method according to claim 1, wherein the method further comprises:
   determining, by the first base station, a measurement subframe from the at least one target subframe, wherein the measurement subframe is a subframe in which interference measurement is performed between the first UE and a second UE, and wherein the second UE is an UE that is served by the second base station and that causes interference to the first UE.

4. The method according to claim 3, wherein the method further comprises:
   sending, by the first base station, target configuration information to the first UE, wherein the target configuration information is used to indicate at least one of the measurement subframe or first scheduling information, and wherein the first UE performs, in the measurement subframe, measurement on a first signal transmitted by the second UE.

5. The method according to claim 3, wherein the method further comprises:
   receiving, by the first base station, interference measurement information sent by the first UE.

6. The method according to claim 1, wherein the configuration information of the second reference signal comprises at least one of a sequence length, a cyclic shift, a format of downlink control information (DCI), a cell identity, an initial value of a Zadoff-Chu sequence, and an orthogonal code that are of the second reference signal.

7. A reference signal transmission method, comprising:
   obtaining, by a first user equipment (UE), at least one target subframe on a target frequency band, wherein the target frequency band is a frequency band whose uplink and downlink transmission directions are configurable, wherein a first base station and a neighboring second base station are different in at least one of uplink-downlink timeslot configurations or transmission directions of the at least one target subframe, and wherein the first base station is a base station to which the first UE belongs; and
   receiving, by the first UE in the at least one target subframe, a first reference signal sent by the first base station, wherein the first reference signal is configured by the first base station based on a second reference signal sent by the second base station, and wherein the first reference signal comprises a demodulation reference signal (DMRS).

8. The method according to claim 7, wherein the first reference signal comprises at least one of a sounding reference signal (SRS), and a first predetermined reference signal.

9. The method according to claim 7, wherein the method further comprises:
   receiving, by the first UE, target configuration information sent by the first base station, wherein the target configuration information is used to indicate at least one of a measurement subframe or first scheduling information that is intended for a second UE, wherein the measurement subframe is a subframe in which interference measurement is performed between the first UE and the second UE, wherein the second UE is an UE that is served by the second base station and that causes interference to the first UE, and wherein the first scheduling information is sent to the first base station by the second base station.

10. The method according to claim 9, wherein the first scheduling information is uplink scheduling information or first predetermined scheduling information.

11. The method according to claim 9, wherein the first scheduling information comprises at least one of an identity of the second UE, an identity of a physical resource block (PRB) occupied by the second UE, and transmit power of the second UE.

12. The method according to claim 9, wherein the method further comprises:
performing, by the first UE in the measurement subframe, measurement on a first signal transmitted by the second UE to obtain a measurement result.

13. The method according to claim 12, wherein the first signal comprises at least one of a DMRS, an SRS, a sequence code, a preamble, and a third predetermined reference signal.

14. The method according to claim 12, wherein the method further comprises:
determining, by the first UE, interference measurement information based on the measurement result.

15. The method according to claim 14, wherein the method further comprises:
receiving, by the first UE, second scheduling information that is determined by the first base station based on at least one of the interference measurement information or the first scheduling information.

16. The method according to claim 15, wherein the method further comprises:
canceling or suppressing, by the first UE, signal interference from the second UE based on the second scheduling information.

17. The method according to claim 15, wherein the second scheduling information is downlink scheduling information or second predetermined scheduling information.

18. The method according to claim 15, wherein the method further comprises:
sending, by the first UE, an interference cancellation capability of the first UE to the first base station.

19. The method according to claim 18, wherein the receiving, by the first UE, second scheduling information that is determined by the first base station based on at least one of the interference measurement information or the first scheduling information comprises:
receiving, by the first UE, the second scheduling information that is determined by the first base station based on at least one of the interference measurement information, the first scheduling information, and the interference cancellation capability of the first UE.

20. The method according to claim 9, wherein the target configuration information is sent by using signaling, wherein the signaling comprises one of Radio Resource Control (RRC) signaling, Media Access Control (MAC) signaling, and physical layer signaling.

* * * * *